United States Patent
Yeo et al.

(10) Patent No.: US 11,233,426 B2
(45) Date of Patent: Jan. 25, 2022

(54) WIRELESS POWER TRANSMISSION APPARATUS, ELECTRONIC APPARATUS FOR RECEIVING POWER WIRELESSLY AND OPERATION METHOD THEREOF

(71) Applicant: SAMSUNG ELECTRONICS CO., LTD., Suwon-si (KR)

(72) Inventors: Sung Ku Yeo, Suwon-si (KR); Sung Bum Park, Suwon-si (KR); Young Ho Ryu, Suwon-si (KR); Chong Min Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/762,054

(22) PCT Filed: Nov. 14, 2018

(86) PCT No.: PCT/KR2018/013921
§ 371 (c)(1),
(2) Date: May 6, 2020

(87) PCT Pub. No.: WO2019/103394
PCT Pub. Date: May 31, 2019

(65) Prior Publication Data
US 2020/0274400 A1    Aug. 27, 2020

(30) Foreign Application Priority Data
Nov. 23, 2017    (KR) .................. 10-2017-0157379

(51) Int. Cl.
*H02J 50/20*    (2016.01)
*H02J 50/90*    (2016.01)
(Continued)

(52) U.S. Cl.
CPC ............ *H02J 50/20* (2016.02); *H02J 50/402* (2020.01); *H02J 50/80* (2016.02); *H02J 50/90* (2016.02)

(58) Field of Classification Search
CPC .................... H02J 50/20–27; H02J 50/40–402
See application file for complete search history.

(56) References Cited

U.S. PATENT DOCUMENTS

| 9,225,396 B2 | 12/2015 | Maltsev et al. |
| 2008/0054729 A1 | 3/2008 | Greene et al. |

(Continued)

FOREIGN PATENT DOCUMENTS

| EP | 3 439 145 A1 | 2/2019 |
| JP | 2016-144194 A | 8/2016 |

(Continued)

OTHER PUBLICATIONS

D. Masotti, A. Costanzo, M. Del Prete and V. Rizzoli, "Time-Modulation of Linear Arrays for Real-Time Reconfigurable Wireless Power Transmission," Jan. 12, 2016, IEEE, IEEE Transactions on Microwave Theory and Techniques, vol. 64, No. 2, pp. 331-342 (Year: 2016).*

(Continued)

*Primary Examiner* — Hal Kaplan
*Assistant Examiner* — David A Shiao
(74) *Attorney, Agent, or Firm* — Sughrue Mion, PLLC

(57) ABSTRACT

A wireless power transmission apparatus according to various embodiments may comprise a plurality of patch antennas, a communication circuit, and a processor. The processor can be configured to perform a control to form an RF wave of a first beam width via the plurality of patch antennas, receive, from an electronic apparatus, via the communication circuit, sensing data for at least one of a movement of the electronic apparatus or an orientation of the electronic (Continued)

apparatus, and adjust a beam width of the RF wave formed by the plurality of patch antennas from the first beam width to a second beam width at least on the basis of the received sensing data.

15 Claims, 27 Drawing Sheets

(51) Int. Cl.
*H02J 50/80* (2016.01)
*H02J 50/40* (2016.01)

(56) References Cited

U.S. PATENT DOCUMENTS

| | | | |
|---|---|---|---|
| 2009/0284227 A1 | 11/2009 | Mohammadian et al. | |
| 2010/0079010 A1* | 4/2010 | Hyde | H02J 50/15 307/149 |
| 2011/0304395 A1 | 12/2011 | Koo et al. | |
| 2012/0316414 A1 | 12/2012 | Greene | |
| 2014/0054961 A1* | 2/2014 | Metcalf | H02J 7/00034 307/19 |
| 2014/0375261 A1* | 12/2014 | Manova-Elssibony | H02J 7/00034 320/108 |
| 2015/0015192 A1* | 1/2015 | Leabman | A01K 11/008 320/108 |
| 2016/0020635 A1 | 1/2016 | Moshfeghi et al. | |
| 2016/0100124 A1 | 4/2016 | Leabman et al. | |
| 2016/0191121 A1 | 6/2016 | Bell et al. | |
| 2017/0085127 A1* | 3/2017 | Leabman | H02J 50/20 |
| 2017/0288475 A1 | 10/2017 | Lee et al. | |
| 2017/0338698 A1* | 11/2017 | Zeine | H02J 50/20 |
| 2018/0069602 A1* | 3/2018 | Perry | H04B 11/00 |
| 2018/0131450 A1* | 5/2018 | Kare | H02J 50/10 |
| 2018/0248411 A1* | 8/2018 | Sagi | H02J 50/90 |
| 2018/0323657 A1* | 11/2018 | Hannigan | H02J 50/23 |
| 2019/0006888 A1* | 1/2019 | Hajimiri | H04B 5/0037 |
| 2019/0067825 A1* | 2/2019 | Zeine | H01Q 13/20 |
| 2020/0174052 A1* | 6/2020 | Homma | B64C 13/20 |
| 2021/0075269 A1* | 3/2021 | Biderman | G06K 9/3216 |

FOREIGN PATENT DOCUMENTS

| | | |
|---|---|---|
| KR | 10-1101617 B1 | 1/2012 |
| KR | 10-2017-0112896 A | 10/2017 |

OTHER PUBLICATIONS

Communication (PCT/ISA/210) dated Feb. 25, 2019 by the International Searching Authority in counterpart International Patent Application No. PCT/KR2018/013921.
Communication (PCT/ISA/237) dated Feb. 25, 2019 by the International Searching Authority in counterpart International Patent Application No. PCT/KR2018/013921.
Communication dated Sep. 21, 2020, from the European Patent Office in European Application No. 18880681.4.

\* cited by examiner

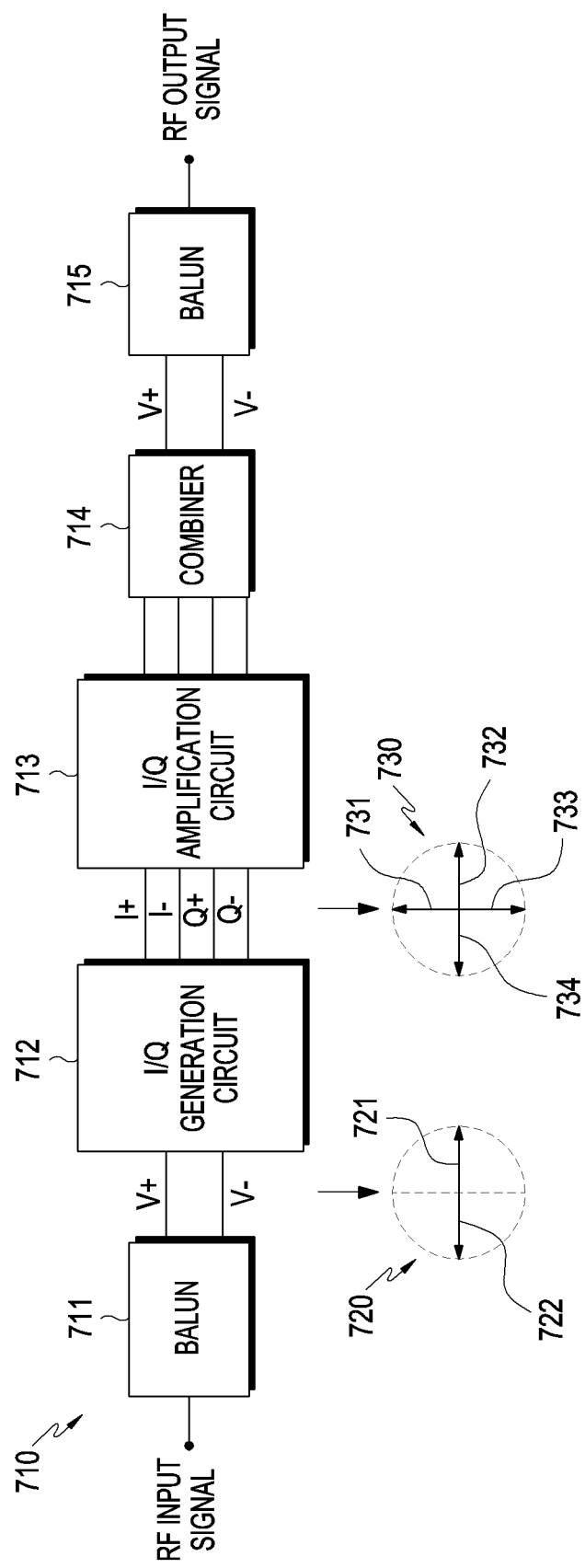

WIRELESS POWER TRANSMISSION APPARATUS, ELECTRONIC APPARATUS FOR RECEIVING POWER WIRELESSLY AND OPERATION METHOD THEREOF

CROSS-REFERENCE TO RELATED APPLICATIONS

This application is a National Phase Entry of PCT International Application No. PCT/KR2018/013921, which was filed on Nov. 14, 2018 and claims priority to Korean Patent Application No. 10-2017-0157379, which was filed on Nov. 23, 2017, the contents of which are incorporated herein by reference.

BACKGROUND

1. Field

Various embodiments of the disclosure relate to a wireless power transmitter, an electronic device wirelessly receiving power, and a method of operating the same.

2. Description of the Related Art

Portable digital communication devices have become a must-have item for everyone in the modern era. Customers desire to receive various high-quality services anytime, anywhere. Recent development of Internet of Thing (IoT) technology bundles various sensors, home appliances, and communication devices up into a single network. A diversity of sensors requires a wireless power transmission system for seamless operations.

Wireless power transmission may come in various types, such as magnetic induction, magnetic resonance, and electromagnetic waves, among which the electromagnetic wave type may advantageously work for remote power transmission as compared with the others.

SUMMARY

Wireless power transmitters of electromagnetic wave type may transmit power in such a manner as to form RF waves. Wireless power transmitters may beam-form RF waves toward an electronic device, and the electronic device may receive the beam-formed RF waves. In relation to the conventional electromagnetic wave types, there is no disclosure as to a configuration of adjusting the beam width of RF waves for charging. However, if a wireless power transmitter forms a fixed beam width of RF waves without considering the charging environment, wireless power transmission/reception would not be done at optimal efficiency.

According to various embodiments of the disclosure, a wireless power transmitter and its method of operation may adjust the beam width of RF waves for charging an electronic device considering various charging environments. According to various embodiments of the disclosure, an electronic device wirelessly receiving power and its method of operation may transmit various pieces of information for adjusting the beam width of RF waves for charging to a wireless power transmitter and, upon receiving the information, the wireless power transmitter may adjust the beam width of RF waves.

According to various embodiments, a wireless power transmitter comprises a plurality of patch antennas, a communication circuit and a processor configured to control to form an RF wave of a first beam width via the plurality of patch antennas, receive sensing data about at least one of a motion of the electronic device or a posture of the electronic device via the communication circuit from the electronic device, and adjust a beam width of the RF wave formed by the plurality of patch antennas from the first beam width to a second beam width based on, at least, the received sensing data.

According to various embodiments, an electronic device comprises a plurality of patch antennas, a sensor, a communication circuit, and a processor configured to control to receive at least part of an RF wave of a first beam width formed from a wireless power transmitter via the plurality of patch antennas, obtain sensing data about at least one of a motion of the electronic device or a posture of the electronic device via the sensor, transmit the sensing data to the wireless power transmitter via the communication circuit, and control to receive at least part of the RF wave whose beam width has been adjusted from the first beam width to a second beam width via the plurality of patch antennas.

According to various embodiments, the RF signal adjustment circuit may include a first balun configured to receive an input RF signal and generate a differential signal corresponding to the input RF signal, an I/Q generation circuit configured to generate a positive I signal, a negative I signal, a positive Q signal, and a negative Q signal corresponding to the differential signal, an I/Q amplification circuit configured to adjust an amplitude of at least one of the positive I signal, the negative I signal, the positive Q signal, or the negative Q signal, a combiner configured to generate synthesized differential signals by synthesizing the positive I signal, the negative I signal, the positive Q signal, and the negative Q signal the amplitude of at least one of which has been adjusted, and a second balun configured to output an output RF signal by synthesizing the synthesized differential signals.

According to various embodiments of the disclosure, there may be provided a wireless power transmitter capable of adjusting the beam width of RF waves considering various charging environments and a method of operating the same. According to various embodiments of the disclosure, there may be provided an electronic device capable of transmitting various pieces of information for adjusting the beam width of RF waves and a method of operating the same. It is thus possible to form RF waves with the optimal beam width depending on the charging environment, thus enabling wireless power transmission/reception at relatively high efficiency.

BRIEF DESCRIPTION OF THE DRAWINGS

FIG. 7B illustrates an adjustment circuit according to various embodiments;

DETAILED DESCRIPTION

Figure 1:
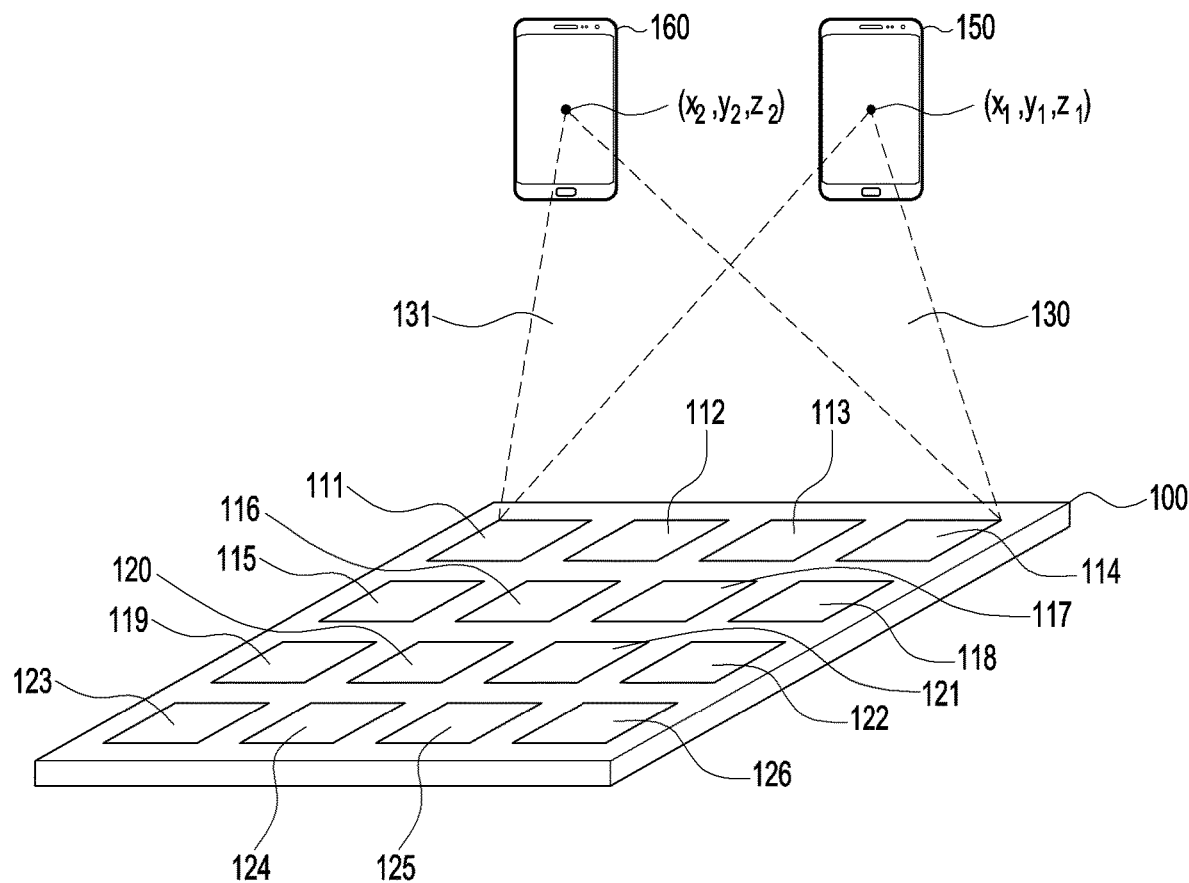
FIG. 1 is a concept view illustrating a wireless power transmission system according to various embodiments.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the wireless power transmitter or electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the wireless power transmitter or electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

According to another embodiment, the wireless power transmitter or the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the wireless power transmitter or electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments, the wireless power transmitter or electronic device may be flexible or may be a combination of the above-enumerated electronic devices. According to an embodiment of the disclosure, the wireless power transmitter or electronic device is not limited to the above-listed embodiments. As used herein, the term "user" may denote a human using the electronic device or another device (e.g., an artificial intelligent electronic device) using the wireless power transmitter or electronic device.

FIG. 1 is a concept view illustrating a wireless power transmission system according to various embodiments.

The wireless power transmitter 100 may wirelessly transmit power to at least one electronic device 150 or 160. According to various embodiments, the wireless power transmitter 100 may include a plurality of patch antennas 111 to 126. The patch antennas 111 to 126 are not limited as long as they each are an antenna capable of producing RF waves. At least one of the amplitude or phase of RF waves produced by the patch antennas 111 to 126 may be adjusted by the wireless power transmitter 100. For ease of description, the RF waves respectively generated by the patch antennas 111 to 126 are denoted sub-RF waves.

According to various embodiments, the wireless power transmitter 100 may adjust at least one of the amplitude or phase of each of the sub-RF waves generated by the patch antennas 111 to 126. The sub-RF waves may interfere with one another. For example, the sub-RF waves may constructively interfere with one another at one point or destructively interfere at another point. According to various embodiments, the wireless power transmitter 100 may adjust at least one of the amplitude or phase of each of the sub-RF waves generated by the patch antennas 111 to 126 so that the sub-RF waves may constructively interfere with one another at a first point (x1, y1, z1). The wireless power transmitter 100 may adjust at least one of the phase or amplitude of electrical signals individually input to the patch antennas 111 to 126, thereby adjusting at least one of the amplitude or phase of each sub RF wave.

For example, the wireless power transmitter 100 may determine that the electronic device 150 is positioned at the first point (x1, y1, z1). Here, the position of the electronic device 150 may be where, e.g., a power receiving antenna of the electronic device 150 is located. The wireless power transmitter 100 may determine the position of the electronic device 150 in various manners. In order for the electronic device 150 to wirelessly receive power at a higher transmission efficiency, the sub-RF waves should constructively interfere with one another at the first point (x1, y1, z1). Accordingly, the wireless power transmitter 100 may control the patch antennas 111 to 126 so that the sub-RF waves may constructively interfere with one another at the first point (x1, y1, z1). Here, controlling the patch antennas 111 to 126 may mean controlling the magnitude of electrical signals inputted to the patch antennas 111 to 126 or controlling the phase (or delay) of signals inputted to the patch antennas 111 to 126. Meanwhile, beamforming, a technique for controlling RF waves to be subject to constructive interference at a certain point, would readily be appreciated by one of ordinary skill in the art. It is also appreciated by one of ordinary skill in the art that the beamforming used in the disclosure is not particularly limited in type. For example, various beamforming methods may be adopted as disclosed in U.S. Patent Application Publication No. 2016/0099611, U.S. Patent Application Publication No. 2016/0099755, and U.S. Patent Application Publication No. 2016/0100124. An RF wave formed by beamforming may be denoted a pocket of energy.

Hence, an RF wave 130 formed by interference among the sub-RF waves may have the maximum amplitude at the first point (x1, y1, z1), and thus, the electronic device 150 may receive wireless power at higher efficiency. For example, the wireless power transmitter 100 may detect that the electronic device 160 is positioned at the second point (x2, y2, z2). The wireless power transmitter 100 may control the patch antennas 111 to 126 so that the sub-RF waves may constructively interfere with one another at the second point (x2, y2, z2) in order to charge the electronic device 160. Hence, an RF wave 131 formed by the sub-RF waves may have the maximum amplitude at the second point (x2, y2, z2), and thus, the electronic device 160 may receive power at a higher efficiency.

Specifically, the electronic device 150 may be positioned relatively at a right side. In this case, the wireless power transmitter 100 may apply a relatively larger delay to sub-RF waves formed by the patch antennas (e.g., 114, 118, 122, and 126) positioned relatively at a right side. In other words, a predetermined time after the sub-RF waves are formed by patch antennas (e.g., 111, 115, 119, and 123) positioned relatively at a left side, sub-RF waves may be generated by the patch antennas (e.g., 114, 118, 122, and 126) positioned relatively at a right side. Thus, the sub-RF waves may simultaneously meet at a relatively right-side point. In other words, the sub-RF waves may constructively interfere with one another at the relatively right-side point. Where beamforming is conducted at a relatively middle point, the wireless power transmitter 100 may apply substantially the same delay to the left-side patch antennas (e.g., 111, 115, 119, and 123) and the right-side patch antennas (e.g., 114, 118, 122, and 126). Further, where beamforming is conducted at a relatively left-side point, the wireless power transmitter 100 may apply a larger delay to the left-side patch antennas (e.g., 111, 115, 119, and 123) than to the right-side patch antennas (e.g., 114, 118, 122, and 126). Meanwhile, according to another embodiment, the wireless power transmitter 100 may substantially simultaneously generate sub-RF waves through all of the patch antennas 111 to 126 and may perform beamforming by adjusting the phase corresponding to the above-described delay.

As set forth above, the wireless power transmitter 100 may determine the position of the electronic devices 150 and 160 and enable the sub-RF waves to constructively interfere with one another at the determined position, allowing for wireless charging at a higher transmission efficiency.

Figure 2:
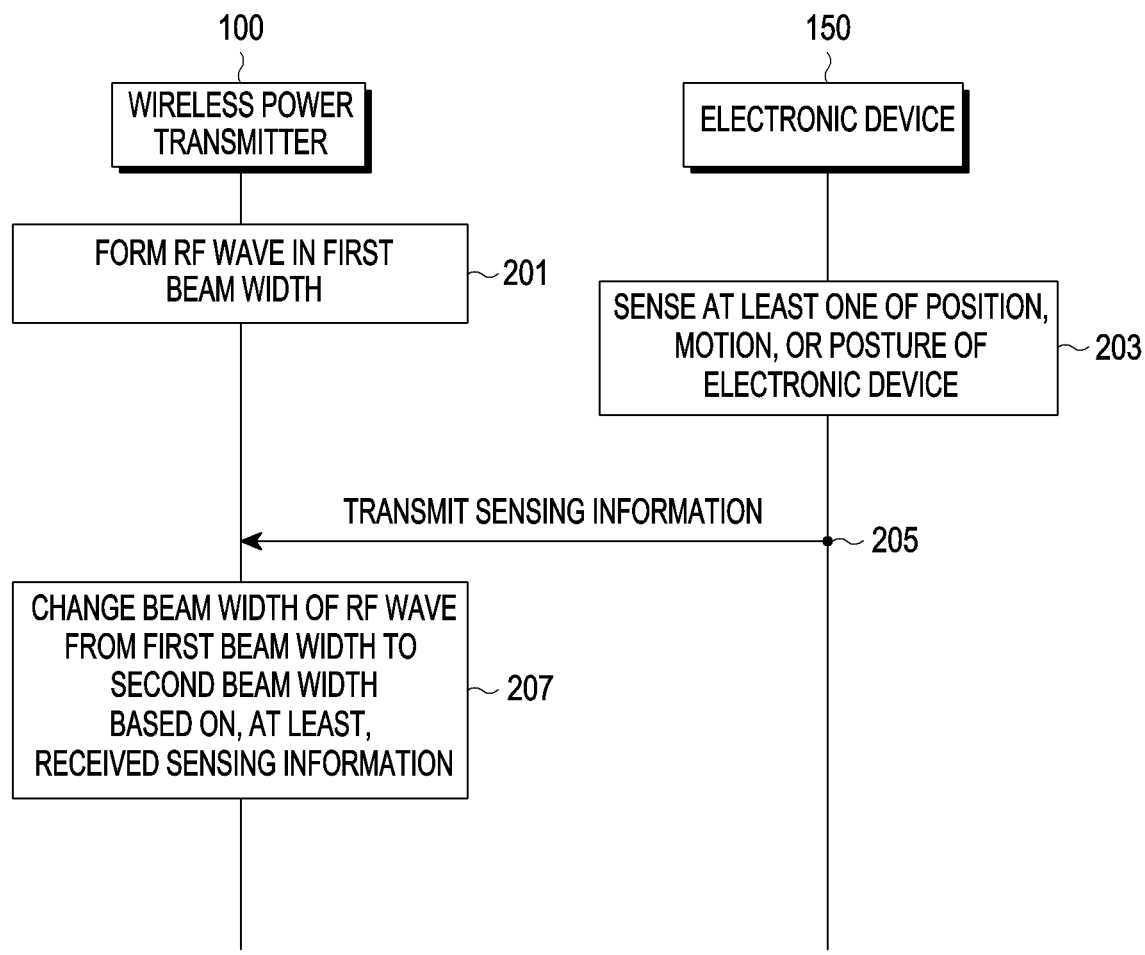
FIG. 2 is a flowchart illustrating a method of operating a wireless power transmitter and an electronic device according to various embodiments.

FIG. 2 is a flowchart illustrating a method of operating a wireless power transmitter and an electronic device according to various embodiments.

In operation 201, according to various embodiments, the wireless power transmitter 100 may produce an RF wave in a first beam width. For example, the wireless power transmitter 100 may previously determine the position of the electronic device 150 and may form an RF wave to be beam-formed in the position of the electronic device 150 based on, at least, the result of determination. As used herein, "wireless power transmitter 100 (or electronic device 150) performs a particular operation" may mean, e.g., that a processor included in the wireless power transmitter 100 (or electronic device 150) performs a particular operation or controls other hardware to perform a particular operation. As used herein, "wireless power transmitter 100 (or electronic device 150) performs a particular operation" may mean, e.g., that a processor performs the particular operation or other hardware performs the particular operation as an instruction stored in a memory included in the wireless power transmitter 100 (or the electronic device 150) is executed. According to various embodiments, the wireless power transmitter 100 may produce an RF wave in a first beam width which is a predesignated beam width. Or, the wireless power transmitter 100 may form an RF wave in the first beam width based on, at least, identified information (e.g., at least one of the distance between the wireless power transmitter 100 and the electronic device 150, the position of the electronic device 150, or the posture of the electronic device 150). Or, the wireless power transmitter 100 may form an RF wave in a prior beam width that it used. According to various embodiments, the wireless power transmitter 100 may vary the beam width of the RF wave by adjusting the number of patch antennas that share the degree of adjustment of at least one of the phase or amplitude of electrical signals entered. At least one patch antenna sharing the degree of adjustment may form sub RF waves of the same phase and amplitude. For example, if the number of patch antennas sharing the degree of adjustment of at least one of phase or amplitude decreases, the beam width of RF waves formed by all of the plurality of patch antennas may reduce and, if the number of patch antennas sharing the degree of adjustment of at least one of the phase or amplitude increases, the beam width of RF waves formed by the plurality of patch antennas may increase. This is described below in greater detail. The wireless power transmitter 100 may set the number of patch antennas sharing the degree of adjustment of at least one of phase or amplitude to a number corresponding to a first beam width. As RF waves with the first beam width are formed, the electronic device 150 may receive at least some of the first beam width of RF waves and process (e.g., rectify or convert) the received power to thereby charge the internal battery or use the same for operating the hardware.

In operation 203, the electronic device 150 may sense at least one of the position, motion, or posture of the electronic device 150. The electronic device 150 may include various sensors capable of sensing at least one of the position, motion, or posture. According to an embodiment, the electronic device 150 may include a gyro sensor capable of sensing the rotation state of the electronic device 150. The electronic device 150 may include a geomagnetic sensor capable of sensing its ambient geomagnetic fields. The electronic device 150 may determine the rotation state of the electronic device 150 based on, at least, sensing data from at least one of the gyro sensor or the geomagnetic sensor. The electronic device 150 may determine the posture of the electronic device 150 based on, at least, the determined rotation state. Or, the electronic device 150 may directly determine the rotation state of the electronic device 150 based on, at least, sensing data from at least one of the gyro sensor or the geomagnetic sensor. The posture of the electronic device 150 may indicate the degree of rotation of the housing of the electronic device 150 as compared with a designated reference posture. For example, the electronic device 150 may rotate around two angular axes (e.g., the θ and φ axes of the spherical coordinate system). Although the posture of the electronic device 150 may be represented with, e.g., two angular axes, it will be easily appreciated by one of ordinary skill in the art that representing the posture of the electronic device 150 is not limited by specific indexes. According to an embodiment, the electronic device 150 may include an acceleration sensor capable of sensing the 3-axis movement state of the electronic device 150. The electronic device 150 may determine at least one of motion information about the electronic device 150, the position of the electronic device 150, or the distance between the electronic device 150 and the wireless power transmitter 100 based on, at least, sensing data from the acceleration sensor. The electronic device 150 may determine the direction of motion and the degree of motion of the electronic device 150 based on, at least, sensing data from the acceleration sensor. The electronic device 150 may apply the direction of motion and degree of motion of the electronic device 150 in a pre-determined position of the electronic device 150, thereby determining the position of the electronic device 150 after the motion of the electronic device 150. The electronic device 150 may apply the direction of motion and degree of motion of the electronic device 150 to a predetermined distance between the electronic device 150 and the wireless power transmitter 100, thereby determining the distance between the electronic device 150 and the wireless power transmitter 100 after the motion of the electronic device 150. According to an embodiment, the electronic device 150 may include at least one of an atmospheric pressure sensor capable of sensing the air pressure, which is available for measuring the height of the electronic device 150 from the ground or a gravity sensor for measuring the gravitational acceleration applied to the electronic device 150. The electronic device 150 may determine information about the height of the electronic device 150 from the ground based on, at least, at least one of sensing data from the atmospheric pressure sensor or sensing data from the gravity sensor. Thus, the electronic device 150 may determine the position of the electronic device 150 along the z axis direction (i.e., the height direction) as well as the 2D-wise position of the electronic device 150, thereby determining the position of the electronic device 150 in the 3D coordinate system.

In operation 205, the electronic device 150 may transmit the sensing information. The sensing information may include sensing data itself (e.g., sensing data from the acceleration sensor or sensing data from the gyro sensor) which is obtained by the electronic device 150 via a sensor or the results of determination (e.g., at least one of the posture of the electronic device 150, the position of the electronic device 150, or the distance between the electronic device 150 and the wireless power transmitter 100) by the electronic device 150 or made using the sensing data. In operation 207, the wireless power transmitter 100 may change the beam width of RF wave from the first beam width to a second beam width based on, at least, the received sensing information. If the received sensing information includes the sensing data itself obtained by the electronic device 150 via a sensor, the wireless power transmitter 100 may determine the posture or position of the electronic device 150 or the distance to the electronic device 150 using the sensing data. If the received sensing information includes at least one of the posture or position of the electronic device 150 or the distance to the electronic device 150, the wireless power transmitter 100 may use the information as it is or may process the information based on at least one of the posture or position of the wireless power transmitter 100. For example, the wireless power transmitter 100 may determine the posture of the electronic device 150 relative to the wireless power transmitter 100 by correcting the posture of the electronic device 150 with respect to its posture. For example, the wireless power transmitter 100 may determine the position of the electronic device 150 relative to the wireless power transmitter 100 by correcting the position of the electronic device 150 with respect to its position.

According to an embodiment, if the distance between the wireless power transmitter 100 and the electronic device 150 is determined to decrease based on, at least, the position, height, or motion information about the electronic device 150 based on at least one of the results identified or determined by the above-described process, the wireless power transmitter 100 may increase the beam width of RF wave. For example, upon determining that the distance between the wireless power transmitter 100 and the electronic device 150 increases, the wireless power transmitter 100 may reduce the beam width of the RF wave. If the distance between the wireless power transmitter 100 and the electronic device 150 is relatively large, and the beam width of the RF waves is big, the RF waves may not concentrate onto the patch antennas for reception but mostly scatter out. Thus, in a relatively large distance between the wireless power transmitter 100 and the electronic device 150, it may be more advantageous to form sharp RF waves towards the electronic device 150 by setting the RF waves to have a smaller beam width.

According to an embodiment, if the electronic device 150 rotates and thus the antennas primarily receiving the RF waves are changed, the wireless power transmitter 100 may vary the beam width corresponding to the antennas for reception of the electronic device 150. For example, if more receiving antennas are determined to primarily receive RF waves, i.e., if the reception area of RF waves is determined to increase, the wireless power transmitter 100 may increase the beam width of RF waves. For example, if fewer receiving antennas are determined to primarily receive RF waves, i.e., if the reception area of RF waves is determined to decrease, the wireless power transmitter 100 may reduce the beam width of RF waves. If the effective reception area of RF wave is relatively large, it would be more advantageous to form RF waves with a relatively large beam width and, if the effective reception area of RF wave is relatively small, forming RF waves of a relatively small beam width would be better. The wireless power transmitter 100 may adjust the beam width of RF wave by adjusting the number of patch antennas that share the degree of adjustment of at least one of, e.g., the phase or amplitude.

Figure 3:
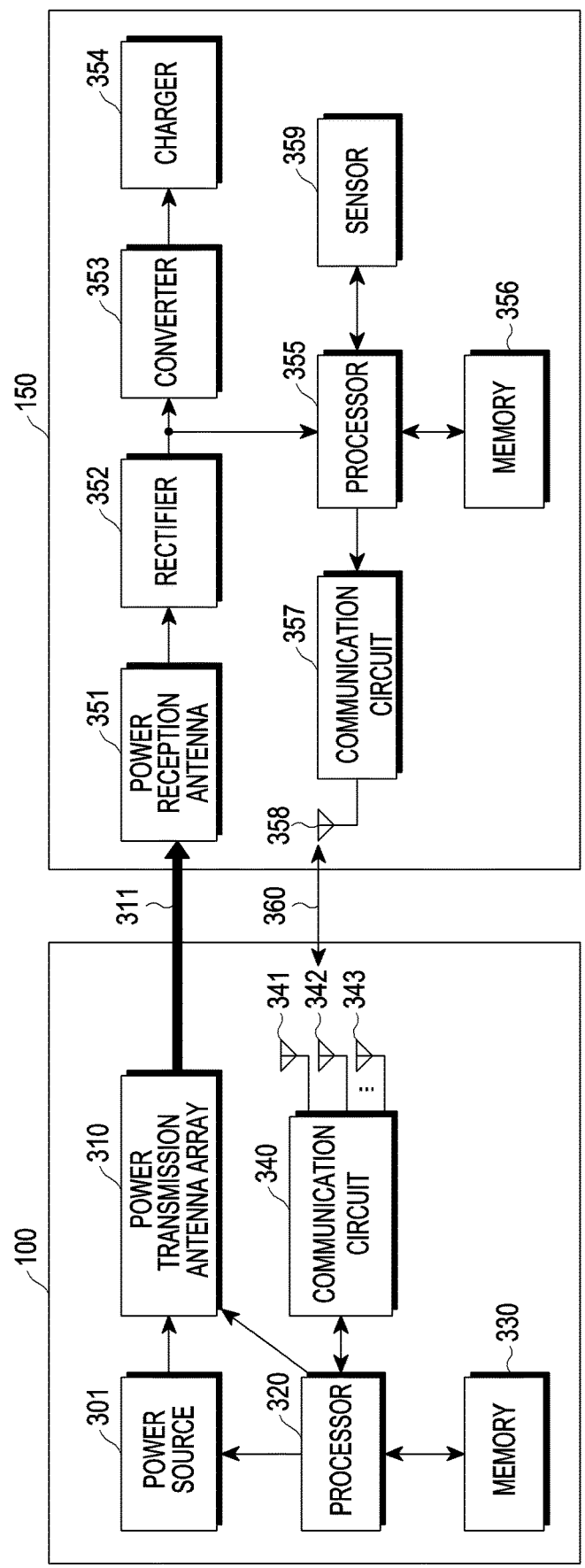
FIG. 3 is a block diagram illustrating a wireless power transmitter and an electronic device according to various embodiments.

FIG. 3 is a block diagram illustrating a wireless power transmitter and an electronic device according to various embodiments.

A wireless power transmitter 100 may include a power source 301, an antenna array 310 for power transmission, a processor 320, a memory 330, a communication circuit 340, and antennas 341 to 343 for communication. An electronic device 150 is not limited as long as it is a device capable of wirelessly receiving power and may include an antenna 351 for power reception, a rectifier 352, a converter 353, a charger 354, a processor 355, a memory 356, a communication circuit 357, an antenna 358 for communication, and a sensor 359.

The power source 301 may provide power for transmission to the antenna array 310 for power transmission. The power source 301 may provide, e.g., direct current (DC) power, in which case the wireless power transmitter 100 may further include an inverter (not shown) that converts DC power into alternating current (AC) power and delivers the AC power to the antenna array 310 for power transmission. Meanwhile, according to another embodiment, the power source 301 may provide AC power to the antenna array 310 for power transmission.

The antenna array 310 for power transmission may include a plurality of patch antennas. For example, a plurality of patch antennas as shown in FIG. 1 may be included in the antenna array 310 for power transmission. The number or array form of the patch antennas is not limited. The antenna array 310 for power transmission may form an RF wave using the power received from the power source 301. The antenna array 310 for power transmission may form an RF wave in a particular direction under the control of the processor 320. Here, forming an RF wave in a particular direction may mean controlling at least one of the amplitude or phase of sub-RF waves so that the sub-RF waves constructively interfere with one another at a point in the particular direction. For example, the processor 320 may control an adjustment circuit (not shown) including at least one of the phase or amplitude connected to an antenna array 310 for power transmission, thereby controlling at least one of the amplitude or phase of sub RF waves. The adjustment circuit may include a phase shifter, an attenuator, or an amplifier. Or, the adjustment circuit may include an I/Q signal generation circuit or an I/Q signal amplifier. The detailed configuration of the adjustment circuit is described below in greater detail. The processor 320 may adjust at least one of the phase or amplitude of electrical signals individually input to the plurality of patch antennas included in the power transmission antenna array 310 by controlling the adjustment circuit (not shown), thereby controlling at least one of the amplitude or phase of sub RF waves. Meanwhile, the antenna array 310 for power transmission is one for transmitting power and may be termed an antenna for power transmission.

The processor 320 may determine the direction in which the electronic device 150 is positioned and determine the direction of formation of the RF wave based on, at least, the determined direction. In other words, the processor 320 may control the patch antennas (or adjustment circuit (not shown)) of the antenna array 310 for power transmission that generates sub-RF waves so that the sub-RF waves constructively interfere with one another at one point in the determined direction. For example, the processor 320 may control at least one of the amplitude and phase of the sub-RF wave individually generated from the patch antennas by controlling the patch antennas or the adjustment circuit connected with the patch antennas.

The processor 320 may determine the direction in which the electronic device 150 is positioned using communication signals received from the antennas 341 to 343 for communication. In other words, the processor 320 may control at least one of the amplitude or phase of the sub-RF wave generated from each patch antenna using the communication signals received from the communication antennas 341 to 343. Although three communication antennas 341 to 343 are shown, this is merely an example, and the number of communication antennas is not limited. According to an embodiment, at least three communication antennas 341 to 343 may be arranged, e.g., for the purpose of determining a three-dimensional (3D) direction, e.g., values θ and φ in the spherical coordinate system. Specifically, the communication circuit 357 of the electronic device 150 may send out the communication signal 360 via the communication antenna 358. According to various embodiments, the communication signal 360 may include various pieces of sensing information obtained via the sensor 359 of the electronic device 150 and various pieces of information, e.g., information about the effective reception area of RF wave or information for determining the beam width, and the communication signal 360 may also include information required for wireless charging. Thus, the wireless power transmitter 100 may determine the direction of the electronic device 150 using the communication signal for wireless charging, without adding a separate hardware structure. The processor 320 may determine a relative direction of the electronic device 150 using a program or algorithm capable of determining a direction and stored in, e.g., the memory 330. According to various embodiments, the processor 320 may determine a relative direction of the electronic device 150 using a lookup table between the direction of the electronic device and the difference in reception time per communication antenna, which is stored in, e.g., the memory 330. The wireless power transmitter 100 (or the processor 320) may determine a relative direction of the electronic device 150 in various manners. For example, the wireless power transmitter 100 (or the processor 320) may determine a relative direction of the electronic device 150 in various ways, such as time difference of arrival (TDOA) or frequency difference of arrival (FDOA), and the program or algorithm determining the direction of received signal is not limited in type. Meanwhile, according to another embodiment, the electronic device 150 may determine a relative direction of the electronic device 150 based on, at least, the phase of the received communication signal. The distances between the communication antenna 358 of the electronic device 150 and the communication antennas 341, 342, and 343 of the wireless power transmitter 100 differ. Thus, the communication signal generated from the communication antenna 358 and received by each communication antenna 341, 342, and 343 may have a different phase. The processor 320 may determine the direction of the electronic device 150 based on the differences in phase of the communication signals of the communication antennas 341, 342, and 343. According to various embodiments, the communication signal 360 may include, e.g., sensing data (e.g., proximity sensor data) capable of indicating whether the electronic device 150 approaches the human body or information (e.g., information about the application that is running or whether Bluetooth is on) for determining whether it approaches the human body, and the wireless power transmitter 100 may determine the beam width of RF wave using the same.

The processor 320 may determine the beam width of an RF wave formed from the power transmission antenna array 310 based on, at least, the information included in the communication signal 360. The processor may determine the number of patch antennas sharing the degree of adjustment of at least one of the phase or amplitude corresponding to the determined beam width. The processor may form an RF wave with the determined beam width towards the electronic device 150 by controlling the power transmission antenna array 310 based on, at least, the determined beam width and the direction of the electronic device 150. Meanwhile, the processor 320 may identify the electronic device 150 using information contained in the communication signal 360. The communication signal 360 may include the unique identifier and unique address of the electronic device. The communication circuit 340 may process the communication signal 360 and provide information to the processor 320. The communication circuit 340 and the communication antennas 341, 342, and 343 may be manufactured based on, at least, various communication schemes, such as wireless-fidelity (Wi-Fi), Bluetooth, zig-bee, and Bluetooth low energy (BLE), which are not limited to a particular type. The communication frequencies (e.g., a frequency band including 2.4 GHz in the case of Bluetooth) used by the communication circuits 340 and 358 may differ from the communication frequency (e.g., a frequency band including 5.8 GHz) used by the power transmission antenna array 310. Meanwhile, the communication signal 360 may include rated power information about the electronic device 150. The processor 320 may determine whether to charge the electronic device 150 based on, at least, at least one of the unique identifier, unique address, and rated power information of the electronic device 150. The processor 320 may include one or more of a central processing unit (CPU), an application processor (AP), or a communication processor (CP), and the processor 320 may be implemented as a micro-controller unit or a mini computer. Further, the communication signal 360 may be used in the process for the wireless power transmitter 100 to identify the electronic device 150, the process of permitting power transmission to the electronic device 150, the process of sending a request for receive power-related information to the electronic device 150, and the process of receiving the receive power-related information from the electronic device 150. In other words, the communication signal 360 may be used in a process for a subscription, command, or request between the wireless power transmitter 100 and the electronic device 150.

Meanwhile, the processor 320 may control the power transmission antenna array 310 (or an adjustment circuit connected thereto), thereby forming an RF wave 311 in the determined direction of the electronic device 150. The processor 320 may form an RF wave for detection and determine the distance to the electronic device 150 using another communication signal subsequently received as a feedback. Thus, the processor 320 may determine both the direction of the electronic device 150 and the distance to the electronic device 150 and may thus determine the position of the electronic device 150. The processor 320 may control the patch antennas so that the sub-RF waves generated from the patch antennas may constructively interfere with one another at the position of the electronic device 150. Therefore, the RF wave 311 may be transferred to the antenna 351 for power reception at a relatively high transmission efficiency. The antenna 351 for power reception is not limited as long as it is an antenna capable of receiving RF waves. Further, the antenna 351 for power reception may be implemented in the form of an array of a plurality of patch antennas. The AC power received by the antenna 351 for power reception may be rectified into DC power by the rectifier 352. The converter 353 may convert the DC power into a voltage required and provide the voltage to the charger 354. The charger 354 may charge a battery (not shown). Although not shown, the converter 353 may provide the converted power to a power management integrated circuit (PMIC) (not shown), and the PMIC (not shown) may provide power to various hardware structures of the electronic device 150.

Meanwhile, the processor 355 may monitor the voltage at the output end of the rectifier 352. For example, the electronic device 150 may further include a voltage meter connected to the output end of the rectifier 352. The processor 355 may receive a voltage value from the voltage meter and monitor the voltage at the output end of the rectifier 352. The processor 355 may provide information containing the voltage value at the output end of the rectifier 352 to the communication circuit 357. Although the charger, converter, and PMIC may be implemented in different hardware units, at least two of them may be integrated into a single hardware unit. Meanwhile, the voltage meter may be implemented in various types, such as an electrodynamic instrument voltage meter, an electrostatic voltage meter, or a digital voltage meter, without limited in type thereto. The communication circuit 357 may send out the communication signal including receive power-related information using the communication antenna 358. The receive power-related information may be information associated with the magnitude of power received, such as, e.g., the voltage at the output end of the rectifier 352, and may contain a current at the output end of the rectifier 352. In this case, it will readily be appreciated by one of ordinary skill in the art that the electronic device 150 may further include a current meter capable of measuring current at the output end of the rectifier 352. The current meter may be implemented in various types, such as a DC current meter, AC current meter, or digital current meter, without limited in type thereto. Further, the receive power-related information may be measured at any point of the electronic device 150, but not only at the output or input end of the rectifier 352.

Further, as set forth above, the processor 355 may send out a communication signal 360 containing identification information about the electronic device 150. The memory 356 may store a program or algorithm capable of controlling various hardware units of the electronic device 150.

According to various embodiments, the processor 355 may include the sensing data from the sensor 359 in the communication signal 360 and transmit the same to the wireless power transmitter 100. Or, the processor 355 may determine the position or posture of the electronic device 150 or the distance between the electronic device 150 and the wireless power transmitter 100 based on, at least, the sensing data from the sensor 359. The processor 355 may include the result of determination in the communication signal 360 and transmit the communication signal 360 to the wireless power transmitter 100. The processor 320 may adjust the beam width of the power transmission antenna array 310 by controlling, e.g., the adjustment circuit, based on, at least, the information included in the communication signal 360.

Figure 4A:
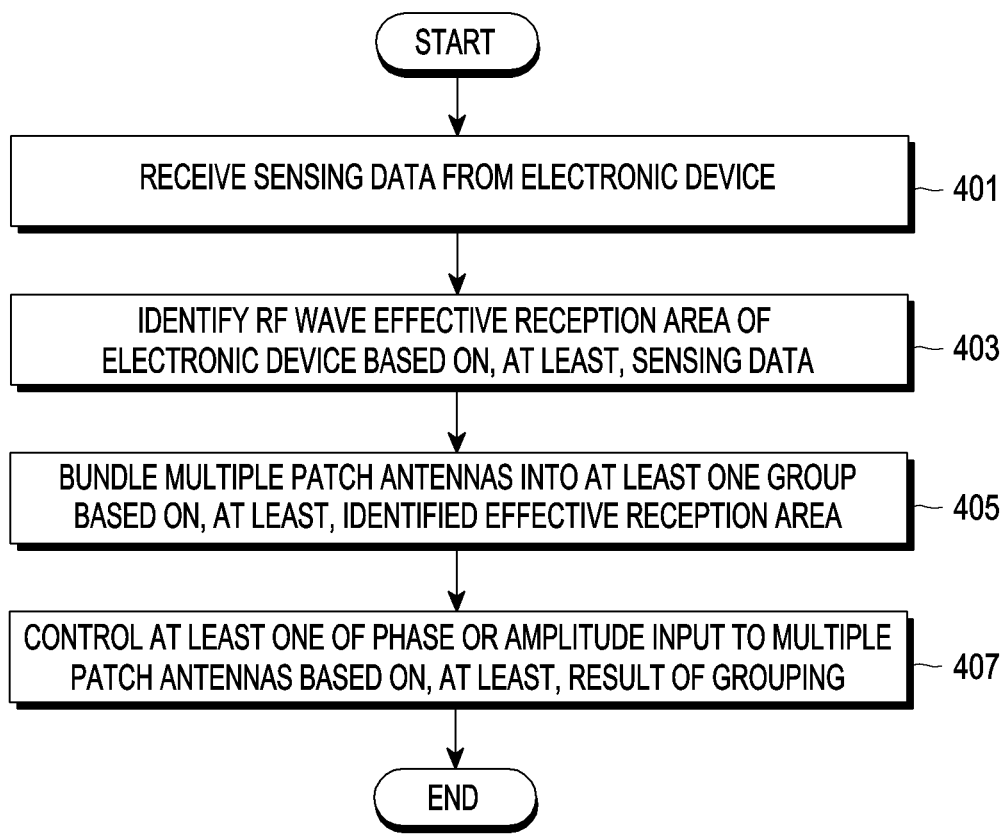
FIG. 4A is a flowchart illustrating a method for operating a wireless power transmitter according to various embodiments.
Figure 4B:
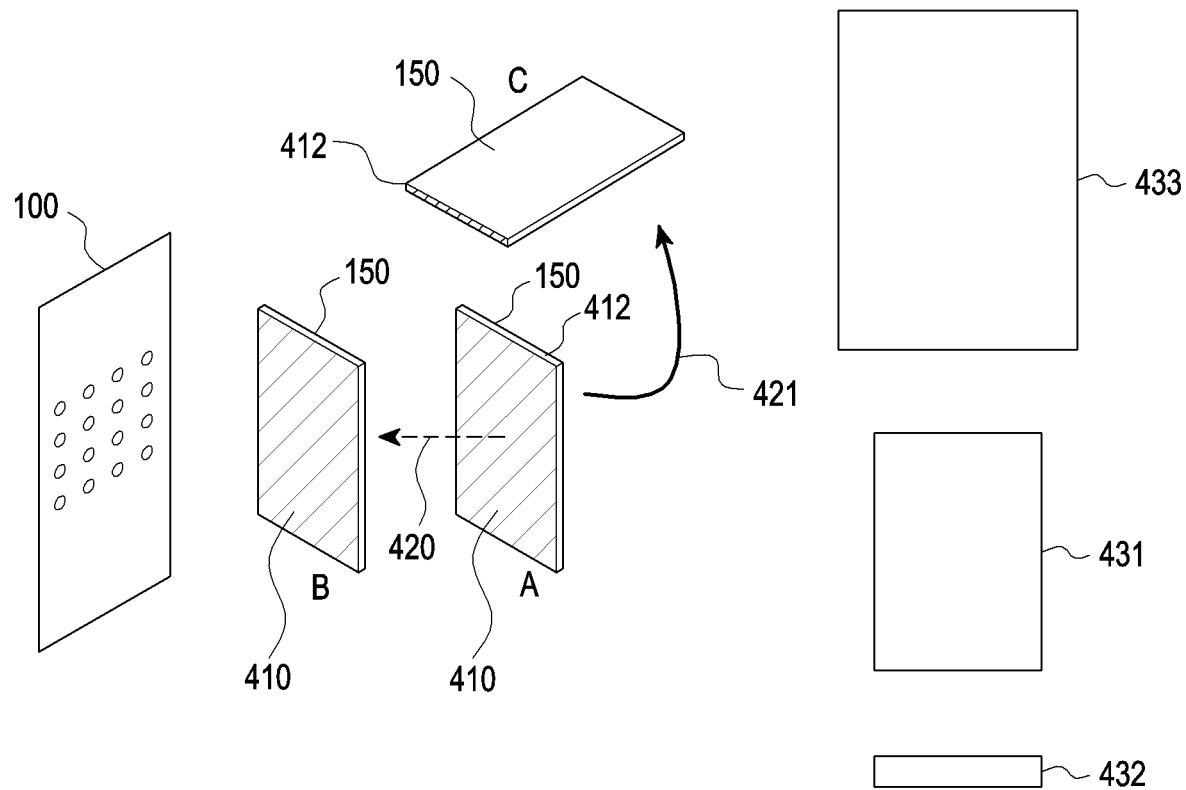
FIG. 4B is a concept view illustrating an effective reception area according to various embodiments.

FIG. 4A is a flowchart illustrating a method for operating a wireless power transmitter according to various embodiments. The embodiment of FIG. 4A is described in greater detail with reference to FIG. 4B. FIG. 4B is a concept view illustrating an effective reception area according to various embodiments.

Referring to FIG. 4A, in operation 401, according to various embodiments, the wireless power transmitter 100 may receive sensing data from the electronic device 150. For example, as set forth above, the wireless power transmitter 100 may receive various pieces of sensing data used for determining, e.g., the position or posture of the electronic device 150 or the distance between the electronic device 150 and the wireless power transmitter 100.

In operation 403, the wireless power transmitter 100 may identify the RF wave effective reception area of the electronic device 150 based on, at least, the sensing data. According to an embodiment, the effective reception area may be determined corresponding to the full area of the reception antenna in which the magnitude of power (e.g., DC power) converted into from the RF wave by the power reception patch antenna exceeds a threshold. Here, the threshold may be preset or may be dynamically set based on at least one of pieces of power (e.g., the maximum power) output from the reception antenna of the electronic device 150. For example, in the embodiment of FIG. 4B, it is assumed that a power reception antenna is placed on the entire surface of the housing of the electronic device 150. If the electronic device 150 is placed in a first posture in position A, the RF waves may be received primarily by the power reception antennas arranged on the first surface 410 of the electronic device 150. For example, the magnitude of power RF-DC converted and output by the power reception antennas arranged on the first surface 410 may exceed the threshold. In this case, the magnitude of power RF-DC converted and output by the power reception antennas arranged on the second surface 412 may be not more than the threshold. This is why the angle between the propagation direction of the RF wave formed from the wireless power transmitter 100 and the first surface 410 is closer to 90 degrees than the angle between the propagation direction of the RF wave formed from the wireless power transmitter 100 and the second surface 412 is. Since the area of the first surface 410 is larger than the area of the second surface 412, the number of power reception antennas arranged on the first surface 410 may be larger than the number of power reception antennas arranged on the second surface 412. In other words, if the electronic device 150 is placed in the first posture in position A, a first effective reception area 431 may be determined corresponding to the number of power reception antennas arranged on the first surface 410.

For example, the electronic device 150 may rotate (421) from position A to position C while turning into a second posture. If the electronic device 150 is placed in the second posture in position C, the RF waves may be received primarily by the power reception antennas arranged on the second surface 412 of the electronic device 150. For example, the magnitude of power RF-DC converted and output by the power reception antennas arranged on the second surface 412 may exceed the threshold, and the magnitude of power RF-DC converted and output by the power reception antennas arranged on the first surface 410 may be not more than the threshold. Since the area of the first surface 410 is larger than the area of the second surface 412, the number of power reception antennas arranged on the first surface 410 may be larger than the number of power reception antennas arranged on the second surface 412. Accordingly, if the effective reception area is determined depending on the area of the second surface 412, a second effective reception area 432 smaller than the first effective reception area 431 may be determined. The wireless power transmitter 100 may determine the posture of the electronic device 150 based on, at least, various pieces of information by which the posture information about the electronic device 150 may be determined, and the wireless power transmitter 100 may determine various effective reception areas 431 and 432 based on, at least, the determined posture of the electronic device 150. Or, the wireless power transmitter 100 may receive information about the number of power reception antennas for which the magnitude of RF-DC converted by the electronic device 150 exceeds a threshold. In this case, the wireless power transmitter 100 may determine the effective reception areas 431 and 432 corresponding to the received number information.

According to an embodiment, the wireless power transmitter 100 may determine the effective reception area based on, at least, the distance between the wireless power transmitter 100 and the electronic device 150. For example, in the embodiment of FIG. 4B, if the electronic device 150 is placed in position A, the wireless power transmitter 100 may determine that the distance between the wireless power transmitter 100 and the electronic device 150 is a first distance. The wireless power transmitter 100 may determine the first effective reception area 431 corresponding to the first distance. Meanwhile, the electronic device 150 may move (420) to position B. The wireless power transmitter 100 may determine that the distance between the electronic device 150 and the wireless power transmitter 100 is a second distance. For example, the wireless power transmitter 100 may determine the second distance based on, at least, motion information received from the electronic device 150. The wireless power transmitter 100 may determine a third effective reception area 433 corresponding to the second distance. According to various embodiments, the wireless power transmitter 100 may determine a relatively large effective reception area as the distance between the wireless power transmitter 100 and the electronic device 150 is short and a relatively small effective reception area as the distance between the wireless power transmitter 100 and the electronic device 150 is long.

According to various embodiments, the wireless power transmitter 100 may determine the effective reception area based on all of the full area of the reception antennas for which the magnitude of power (e.g., DC power) converted into from RF waves exceeds the threshold and the distance between the wireless power transmitter 100 and the electronic device 150.

In operation 405, the wireless power transmitter 100 may put the plurality of patch antennas in at least one group based on, at least, the identified effective reception area. The patch antennas in one group may share at least one of the degree of phase adjustment or the degree of amplitude adjustment of electrical signals received. The wireless power transmitter 100 may adjust at least one of the degree of phase adjustment or the degree of amplitude adjustment to differ between different groups. For example, the wireless power transmitter 100 may adjust the phase of electrical signals individually input to at least one patch antenna included in a first group, by a first degree of phase adjustment, and thus, the electrical signals individually input to the at least one patch antenna included in the first group may be all phase-adjusted by the first degree of phase adjustment. Thus, the at least one patch antenna included in the first group may form sub RF waves whose phases have been adjusted by the first degree of phase adjustment. Further, the wireless power transmitter 100 may adjust the phase of electrical signals individually input to at least one patch antenna included in a second group, by a second degree of phase adjustment, and thus, the electrical signals individually input to the at least one patch antenna included in the second group may be all phase-adjusted by the second degree of phase adjustment. In this case, the first degree of phase adjustment and the second degree of phase adjustment may differ from each other.

In operation 407, the wireless power transmitter 100 may control at least one of the phase or amplitude of electrical signals input to the plurality of patch antennas based on, at least, the result of grouping. As set forth above, the wireless power transmitter 100 may adjust at least one of the phase or amplitude of electrical signals applied to at least one patch antenna included in one group to have the same magnitude. For example, the wireless power transmitter 100 may put the plurality of patch antennas into as many groups as a first unit number so as to form a first beam width of RF waves corresponding to the first effective reception area. For example, the wireless power transmitter 100 may put the plurality of patch antennas into as many groups as a second unit number so as to form a second beam width of RF waves corresponding to the second effective reception area. Here, the second beam width may be smaller than the first beam width and, resultantly, the second unit number may be smaller than the first unit number. For example, the wireless power transmitter 100 may put the plurality of patch antennas into as many groups as a third unit number so as to form a third beam width of RF waves corresponding to the third effective reception area. Here, the third beam width may be larger than the first beam width and, resultantly, the third unit number may be larger than the first unit number.

Figure 4C:
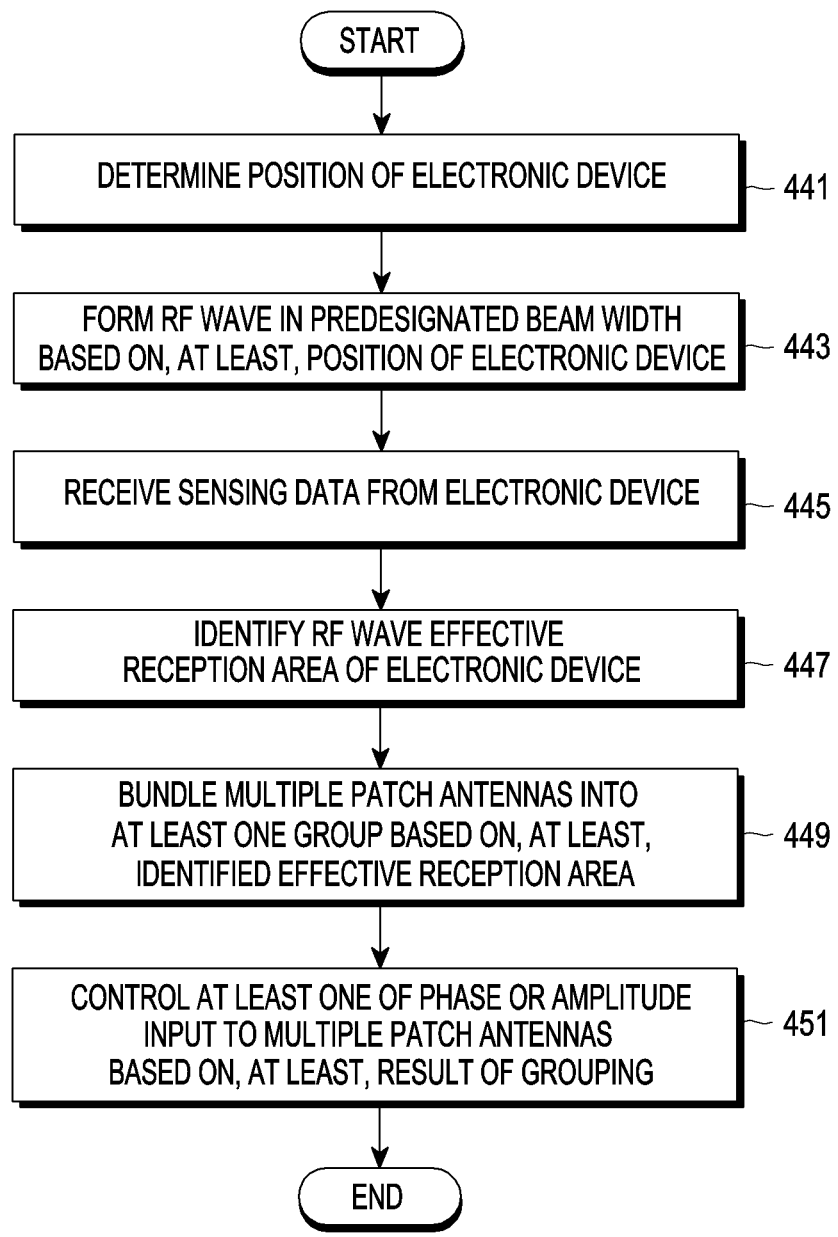
FIG. 4C is a flowchart illustrating a method for operating a wireless power transmitter according to various embodiments.

FIG. 4C is a flowchart illustrating a method for operating a wireless power transmitter according to various embodiments.

In operation 441, according to various embodiments, the wireless power transmitter 100 may determine the position of the electronic device 150. According to various embodiments, the wireless power transmitter 100 may receive a communication signal from the electronic device 150 and determine the direction in which the electronic device 150 is positioned using the received communication signal. For example, the wireless power transmitter 100 may include a plurality of communication antennas and may thus determine the direction in which the electronic device 150 is positioned based on various schemes, such as the TDOA or FDOA. The wireless power transmitter 100 may determine the distance between the wireless power transmitter 100 and the electronic device 150 based on the reception strength of communication signal (e.g., received signal strength indication (RSSI)). The communication signal may include the transmission strength, and the wireless power transmitter 100 may determine the distance between the wireless power transmitter 100 and the electronic device 150 based on the transmission strength and reception strength of the communication signal. Or, the communication signal may include information about the time of transmission. The wireless power transmitter 100 may determine the time-of-flight (TOF) of the communication signal based on the time of transmission and time of reception of the communication signal and may determine the distance between the wireless power transmitter 100 and the electronic device 150 using the TOF. According to another embodiment, the wireless power transmitter 100 may determine the position of the electronic device 150 based on vision recognition. Or, the wireless power transmitter 100 may receive information about the position of the electronic device 150 directly from the electronic device 150. The electronic device 150 may determine its position based on, at least, various indoor positioning schemes (e.g., an indoor positioning scheme using geomagnetic map data or an indoor positioning scheme using signals output from access points (APs)). The electronic device 150 may include the position information for the electronic device 150 in the communication signal and transmit the communication signal to the wireless power transmitter 100, and the wireless power transmitter 100 may thus determine the position of the electronic device 150. The wireless power transmitter 100 may receive the position information about the electronic device 150 from another electronic device 150 that determines the positions of the ambient devices. It will readily be appreciated by one of ordinary skill in the art that the determination of the position of the electronic device 150 by the wireless power transmitter 100 is not limited to a particular one.

In operation 443, the wireless power transmitter 100 may form RF waves with a predesignated beam width based on, at least, the position of the electronic device 150. The wireless power transmitter 100 may adjust at least one of the phase or amplitude of electrical signals individually input to the plurality of patch antennas of the wireless power transmitter 100 so that the RF waves may constructively interfere with each other in the identified position of the electronic device 150. The wireless power transmitter 100 may form RF waves in the designated beam width. The wireless power transmitter 100 may set the number of patch antennas sharing the degree of adjustment of at least one of the phase or amplitude to a preset number. In other words, the wireless power transmitter 100 may set the number of patch antennas included in one group to a preset number.

In operation 445, the wireless power transmitter 100 may receive sensing data from the electronic device 150. The electronic device 150 may transmit various pieces of sensing data that may be used in determining at least one of the position of the electronic device 150, the distance between the electronic device 150 and the wireless power transmitter 100, or the posture of the electronic device 150. In operation 447, the wireless power transmitter 100 may identify the RF wave effective reception area of the electronic device. For example, the wireless power transmitter 100 may identify the effective reception area based on at least one of the position of the electronic device 150, the distance between the electronic device 150 and the wireless power transmitter 100, or the posture of the electronic device 150. In operation 449, the wireless power transmitter 100 may put the plurality of patch antennas in at least one group based on, at least, the identified effective reception area. The number of patch antennas included in one group may differ from the preset number. In operation 451, the wireless power transmitter 100 may control at least one of the phase or amplitude input to the plurality of patch antennas based on, at least, the result of grouping. The wireless power transmitter 100 may set at least one of the degree of phase adjustment or degree of amplitude adjustment for the electrical signals input to the patch antennas included in one group to be the same.

Figure 5A:
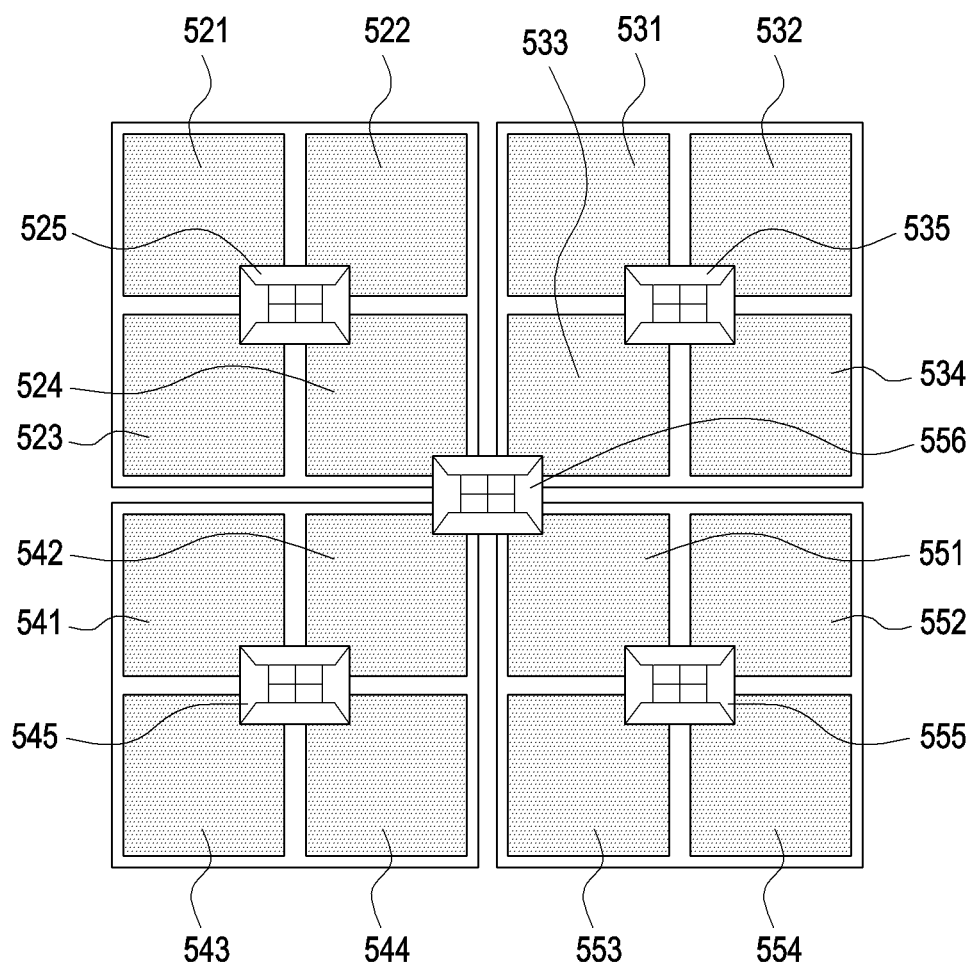
FIGS. 5A and 5B are views illustrating grouping of patch antennas according to various embodiments.
Figure 5B:
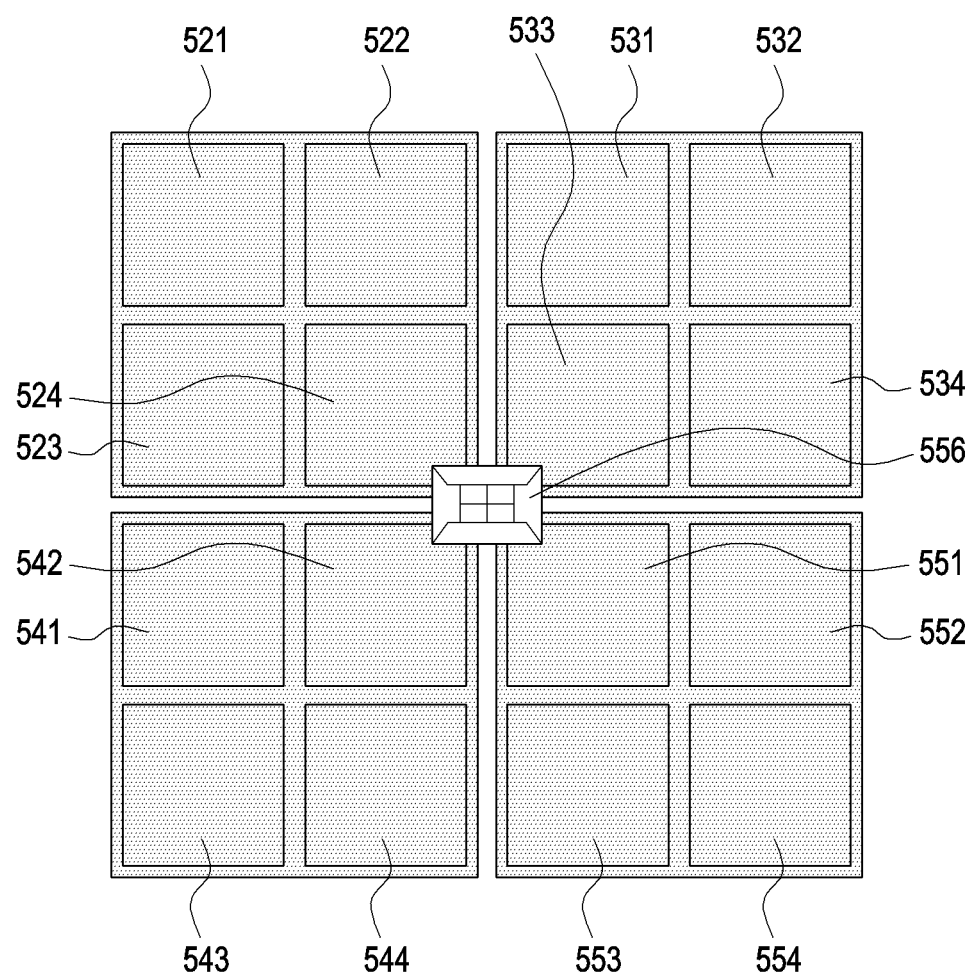

FIGS. 5A and 5B are views illustrating grouping of patch antennas according to various embodiments.

Referring to FIG. 5A, according to various embodiments, the wireless power transmitter 100 may include a plurality of patch antennas 521, 522, 523, 524, 531, 532, 533, 534, 541, 542, 543, 544, 551, 552, 553, and 554 arranged in 2D. Although FIG. 5A illustrates that the plurality of patch antennas are arranged in the shape of a 4×4 grid, this is merely an example, and the number and arrangement of the patch antennas are not limited thereto. For example, the wireless power transmitter 100 may include 64 patch antennas which are arrayed in a 8×8 grid, and the number of patch antennas is not limited thereto. A distribution circuit 525 may be connected to a plurality of patch antennas 521, 522, 523, and 524, a distribution circuit 535 may be connected to a plurality of patch antennas 531, 532, 533, and 534, a distribution circuit 545 may be connected to a plurality of patch antennas 541, 542, 543, and 544, and a distribution circuit 555 may be connected to a plurality of patch antennas 551, 552, 553, and 554. The patch antennas 525, 535, 545, and 555 may be connected to a distribution circuit 556. The distribution circuit 556 may distribute electrical signals from a power source into the four patch antennas 525, 535, 545, and 555. The distribution circuit 525 may distribute the received electrical signals into four patch antennas 521, 522, 523, and 524, the distribution circuit 535 may distribute the received electrical signals into four patch antennas 531, 532, 533, and 534, the distribution circuit 545 may distribute the received electrical signals into four patch antennas 541, 542, 543, and 544, and the distribution circuit 555 may distribute the received electrical signals into four patch antennas 551, 552, 553, and 554. At least one circuit capable of adjusting at least one of the phase or amplitude of electrical signals may be connected between each of the patch antennas 521, 522, 523, 524, 531, 532, 533, 534, 541, 542, 543, 544, 551, 552, 553, and 554 and each of the distribution circuits 525, 535, 545, and 555.

Referring to FIG. 5B, the wireless power transmitter 100 may determine to form RF waves with the first beam width. The wireless power transmitter 100 may determine that the number of patch antennas included in one group, e.g., the number of patch antennas sharing the degree of phase adjustment and the degree of amplitude adjustment is four, corresponding to the first beam width. For example, the wireless power transmitter 100 may bundle the plurality of patch antennas 521, 522, 523, and 524 into a first group, the plurality of patch antennas 531, 532, 533, and 534 into a second group, the plurality of patch antennas 541, 542, 543, and 544 into a third group, and the plurality of patch antennas 551, 552, 553, and 554 into a fourth group. The wireless power transmitter 100 may set the electrical signals input to the patch antennas 521, 522, 523, and 524 of the first group to be identical in at least one of the phase or amplitude. For example, if the electrical signal input to the patch antenna 521 is adjusted to be phase-delayed by 45 degrees, the wireless power transmitter 100 may adjust the electrical signals input to the remaining patch antennas 522, 523, and 524 to be 45 degrees phase-delayed. Further, the patch antennas included in the second group may form RF waves adjusted likewise, the patch antennas included in the third group may form RF waves adjusted likewise, and the patch antennas included in the fourth group may form RF waves adjusted likewise. As four patch antennas, i.e., 2×2 patch antennas, receive the likewise-adjusted electrical signals, a first beam width of RF waves may be formed. The first beam width may be larger than the second beam width that is formed when 1×1 patch antennas receive likewise-adjusted electrical signals. The first beam width may be smaller than the third beam width that is formed when 4×4 patch antennas receive likewise-adjusted electrical signals. According to various embodiments, the wireless power transmitter 100 may adjust the number of patch antennas included in the group on a four-times basis, e.g., 1×1, 2×2, or 4×4, and may accordingly adjust the beam width of RF waves.

According to various embodiments, the wireless power transmitter 100 may determine, e.g., that the electronic device 150 goes farther away or the effective reception area of the electronic device 150 reduces and may thus determine to reduce the beam width. The wireless power transmitter 100 may form sharper RF waves by reducing the number of patch antennas included in one group, i.e., the number of patch antennas sharing the degree of adjustment. For example, the wireless power transmitter 100 may set the number of patch antennas included in the group to 1. In this case, the wireless power transmitter 100 may set the electrical signals input individually input to the plurality of patch antennas 521, 522, 523, and 524 to differ in at least one of the phase or amplitude. As described above, the wireless power transmitter 100 may set one group in various forms, e.g., 1×1, 2×2, 4×4, or 8×8, and the beam width of RF waves may be set depending on the settings. Adjusting the beam width of RF waves may also be termed adjusting the resolution of RF waves.

Figure 6A:
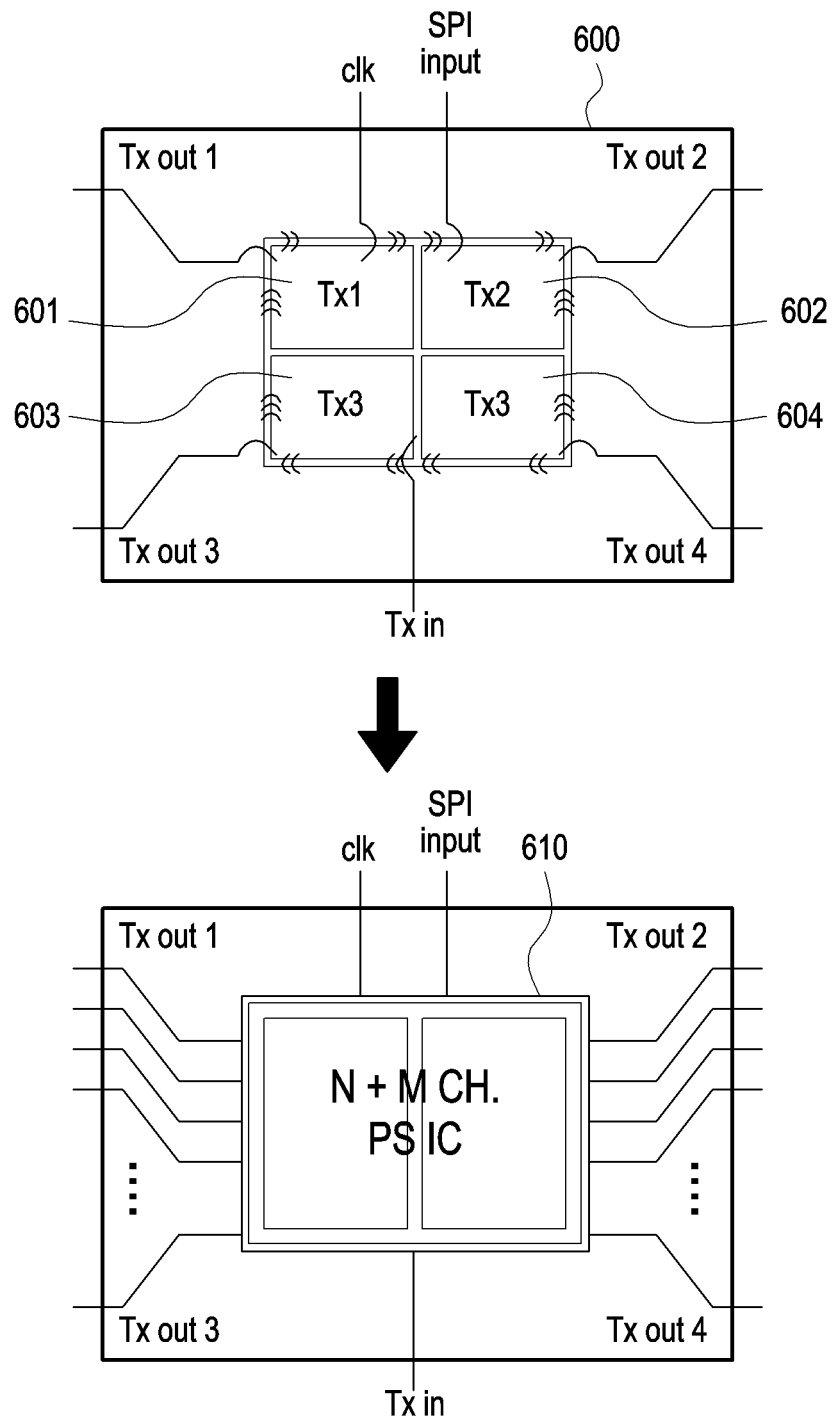
FIG. 6A is a view illustrating a distribution and adjustment circuit according to various embodiments.

FIG. 6A is a view illustrating a distribution and adjustment circuit according to various embodiments.

Referring to FIG. 6A, a distribution and adjustment circuit 600 may include an input path Tx in through which electrical signals may be input, and electrical signals may be input from a power source or another distribution circuit through the input path Tx in. The input electrical signals may be divided into four each of which may be input to a respective one of a first adjustment circuit Tx1, a second adjustment circuit Tx2, a third adjustment circuit Tx3, and a fourth adjustment circuit Tx4. The first adjustment circuit Tx1, the second adjustment circuit Tx2, the third adjustment circuit Tx3, and the fourth adjustment circuit Tx4 each may adjust at least one of the phase or amplitude of the received signal. The first adjustment circuit Tx1, the second adjustment circuit Tx2, the third adjustment circuit Tx3, and the fourth adjustment circuit Tx4 each may include at least one of a phase shifter capable of phase adjustment or an attenuator capable of amplitude adjustment. The processor may adjust at least one of the phase or amplitude of electrical signal input to each of the first adjustment circuit Tx1, the second adjustment circuit Tx2, the third adjustment circuit Tx3, and the fourth adjustment circuit Tx4 using signals, such as clk or SPI input. The adjusted electrical signals may be output individually through four output paths Tx out1, Tx out2, Tx out3, and Tx out4. Meanwhile, according to various embodiments, the distribution and adjustment circuit (N+M CH. PSIC, N+M channel phase shifting integrated circuit) may have N+M channels with outputs except for four outputs and may adjust at least one of the phase or amplitude of electrical signals individually input to the channels based on, at least, the clk and SIP input. The above-described structure enables real-time adjustment of beam width when one group includes a small number of patch antennas as well as when one group includes multiple patch antennas.

Figure 6B:
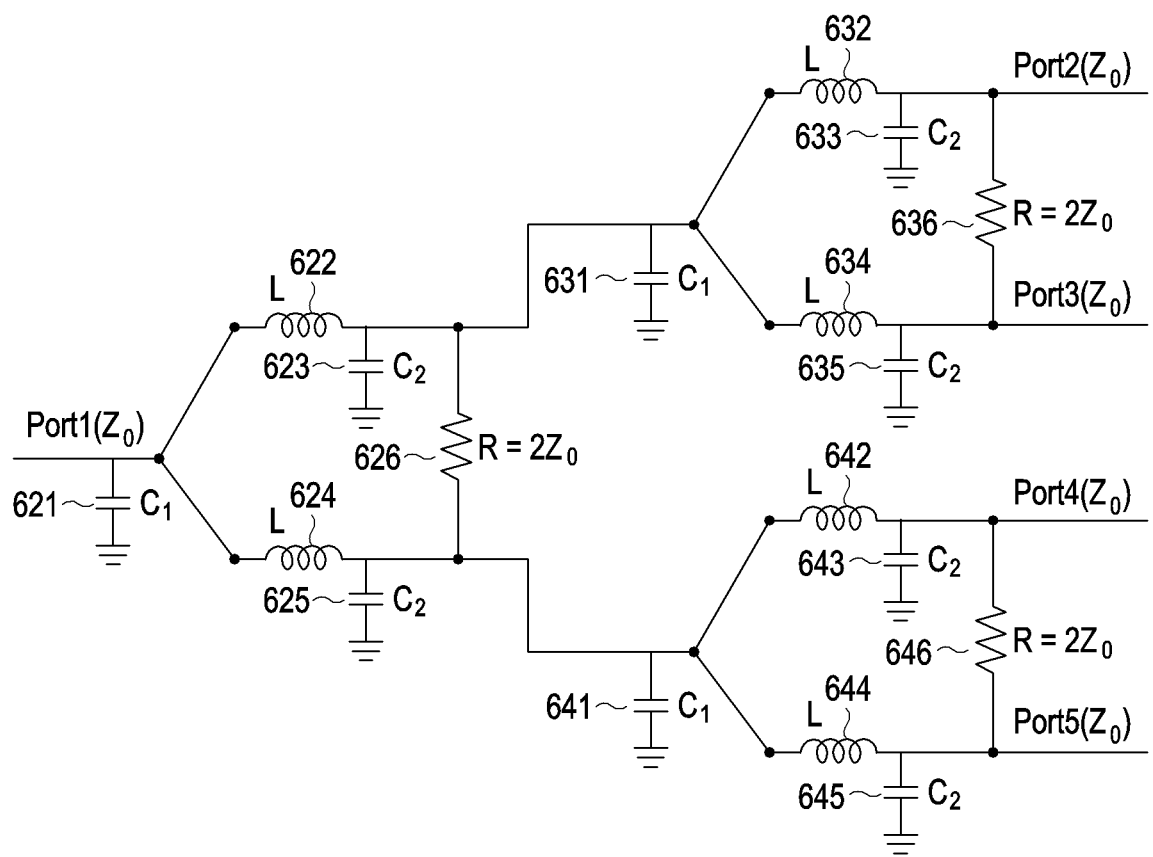
FIG. 6B is a circuit diagram illustrating a distribution and adjustment circuit according to various embodiments.

FIG. 6B is a circuit diagram illustrating a distribution and adjustment circuit according to various embodiments. Referring to FIG. 6B, an input end (Port($Z_0$)) may be connected with an end of a capacitor 621 whose capacitance is C1, an end of an inductor 622 whose inductance is L, and an end of an inductor 624 whose inductance is L. The other terminal of the capacitor 621 may be grounded. C1 and L may be determined depending on the frequency of the electrical signal input to the input end (Port($Z_0$)). The other end of the inductor 622 may be connected with an end of a capacitor 623 whose capacitance is C2, an end of a resistor 626 whose resistance is $2Z_0$, an end of a capacitor 631 whose capacitance is C1, an end of an inductor 632 whose inductance is L, and an end of an inductor 634 whose inductance is L. The other terminal of the capacitor 631 may be grounded. The other end of the inductor 632 may be connected with an end of a capacitor 633 whose capacitance is C2 and an end of a resistor 636 whose resistance is $2Z_0$, and a first output end (Port2($Z_0$)). The other end of the inductor 634 may be connected with an end of a capacitor 635 whose capacitance is C2 and the other end of the resistor 636 whose resistance is $2Z_0$, and a second output end (Port3($Z_0$)). The other end of the capacitor 633 may be grounded, and the other end of the capacitor 635 may be grounded. The other end of the inductor 624 may be connected with an end of a capacitor 625 whose capacitance is C2, the other end of the resistor 626, an end of a capacitor 641 whose capacitance is C1, an end of an inductor 642 whose inductance is L, and an end of an inductor 644 whose inductance is L. The other end of the capacitor 625 may be grounded, and the other end of the capacitor 641 may be grounded. The other end of the inductor 642 may be connected with an end of a capacitor 643 whose capacitance is C2 and an end of a resistor 646 whose resistance is $2Z_0$, and a third output end (Port4($Z_0$)). The other end of the inductor 644 may be connected with an end of a capacitor 645 whose capacitance is C2 and the other end of the resistor 646 whose resistance is $2Z_0$, and a fourth output end (Port5($Z_0$)). The other end of the capacitor 643 may be grounded, and the other end of the capacitor 645 may be grounded. Thus, electrical signals input to the input end (Port1($Z_0$)) may be distributed to the four output ends (Port2($Z_0$), Port3($Z_0$), Port4($Z_0$), and Port5($Z_0$)).

Figure 7A:
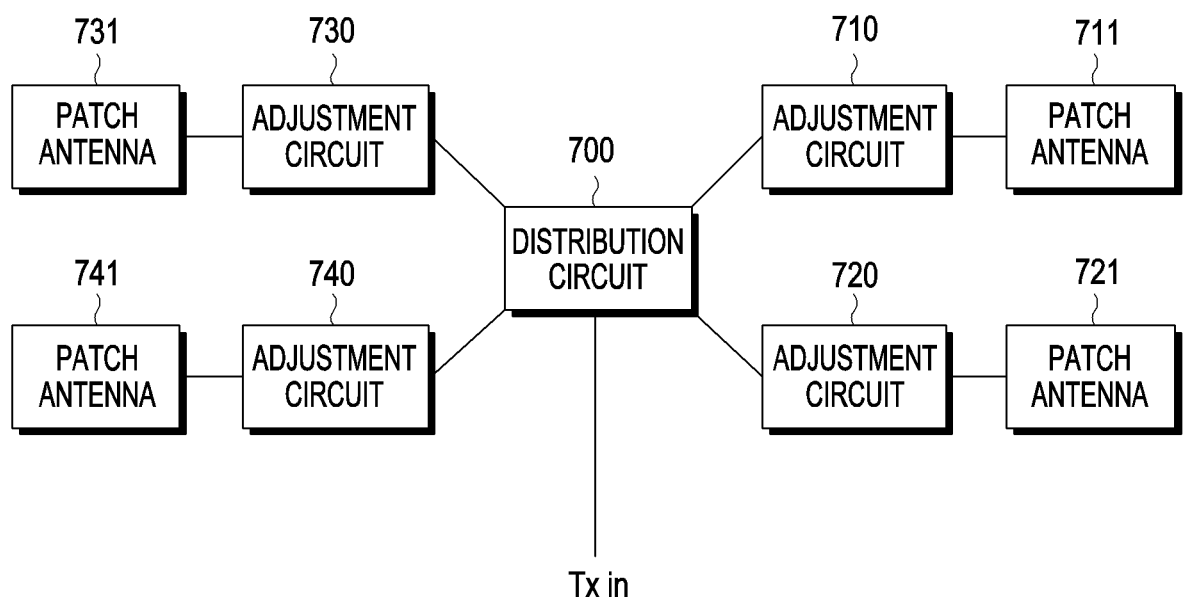
FIG. 7A is a block diagram illustrating a distribution circuit, an adjustment circuit, and a patch antenna according to various embodiments.

FIG. 7A is a block diagram illustrating a distribution circuit, an adjustment circuit, and a patch antenna according to various embodiments.

A distribution circuit 700 may receive electrical signals from a power source or another distribution circuit through the input path Tx in. The distribution circuit 700 may divide the electrical signals into four and transfer them individually to adjustment circuits 710, 720, 730, and 740 via the four output paths. Each of the adjustment circuits 710, 720, 730, and 740 may adjust at least one of the phase or amplitude of the received electrical signal. Each of the adjustment circuits 710, 720, 730, and 740 may adjust at least one of the phase or amplitude of the received electrical signal, e.g., under the control of the processor. Each of the adjustment circuits 710, 720, 730, and 740 may include at least one of a circuit capable of adjusting the phase of electrical signal or a signal or amplification circuit capable of adjusting the amplitude of electrical signal. According to an embodiment, the adjustment circuits 710, 720, 730, and 740 each may include at least one of a phase shifter, an attenuator, or an amplifier. According to another embodiment, the adjustment circuits 710, 720, 730, and 740 each may convert the input signal into an I/Q signal, adjust the amplitude of the I/Q signal, synthesize the adjusted I/Q signal, and thereby adjust at least one of the phase or amplitude of the overall electrical signal. This described below in greater detail with reference to FIG. 7B. If the number of patch antennas sharing the degree of phase adjustment or degree of amplitude adjustment is set to one, the wireless power transmitter 100 may control the degrees of adjustment of the adjustment circuits 710, 720, 730, and 740 to differ. If the number of patch antennas sharing the degree of phase adjustment or degree of amplitude adjustment is set to four, the wireless power transmitter 100 may control the degrees of adjustment of the adjustment circuits 710, 720, 730, and 740 to be identical.

FIG. 7B illustrates an adjustment circuit according to various embodiments.

Figure 7C:
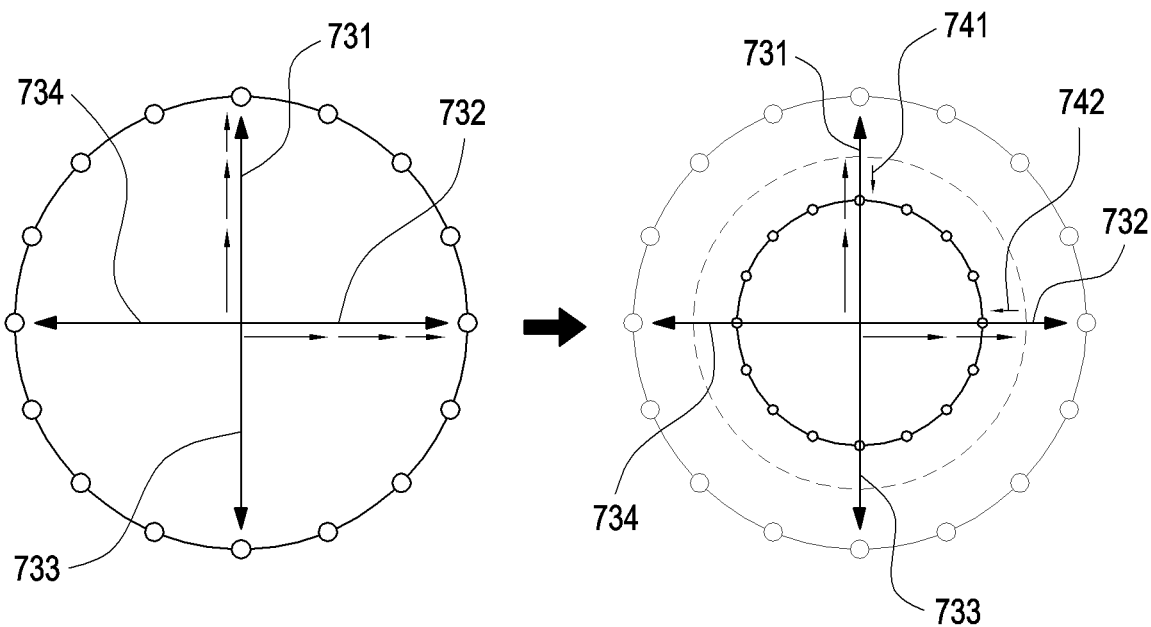
FIGS. 7C and 7D illustrate a differential signal and an I/Q signal in an I/Q domain according to various embodiments.

According to various embodiments, an adjustment circuit 710 may include a balun 711, an I/Q generation circuit 712, an I/Q amplification circuit 713, a combiner 714, and a balun 715. The balun 711 may generate differential signals V+ and V− using an RF input signal (i.e., an electrical signal). The differential signals V+ and V− may be represented as a first vector 721 and a second vector 722 in the I/Q domain 720. The differential signals V+ and V− may be input to the I/Q generation circuit 712. The I/Q generation circuit 712 may generate a positive I signal (in-phase signal) I+ and a positive Q signal (quadrature-phase signal) Q+ using the input positive differential signal V+ and a negative I signal I− and a negative Q signal Q− using the negative differential signal V−. The I/Q signals I+, I−, Q+, and Q− may be represented as a third vector 731, a fourth vector 732, a fifth vector 733, and a sixth vector 734 in the I/Q domain 730. The I/Q amplification circuit 713 may receive the I/Q signals I+, I−, Q+, and Q− and adjust each of the I/Q signals I+, I−, Q+, and Q−. The wireless power transmitter 100 (e.g., a processor) may determine the degree of adjustment of at least one of the phase or amplitude of RF input signal (electrical signal) based on, at least, beamforming information (e.g., position information about the electronic device 150). The wireless power transmitter 100 (e.g., a processor) may adjust the amplitude of at least one of the I/Q signals I+, I−, Q+, and Q-corresponding to the determine degree of adjustment. For example, as shown in FIG. 7C, the wireless power transmitter 100 may reduce (741) the amplitude of the third vector 731 among the third vector 731, the fourth vector 732, the fifth vector 733, and the sixth vector 734 and reduce (742) the amplitude of the fourth vector 742 in the I/Q domain 730. Thus, if the four amplitude-adjusted signals are synthesized, the synthesized signals may be adjusted in at least one of the phase or amplitude as intended. Meanwhile, although FIG. 7C illustrates that the amplitudes of the third vector 731 and the fourth vector 732 reduce (741 and 742), this is merely an example, and the wireless power transmitter 100 may increase the amplitude of at least one of the I/Q signals I+, I−, Q+, and Q−. The combiner 714 (e.g., a differential combiner) may synthesize the amplitude-adjusted I/Q signals into the differential signals V+ and V−. The balun 715 may synthesize the differential signals V+ and V− into single-ended signals, so that an RF output signal may be output. As described above, the RF output signal may be a signal which has been adjusted in at least one of the phase or amplitude. As at least one of the phase or amplitude is adjusted via the structure of FIG. 7B, the adjustment circuit may not include a phase shifter or attenuator. Thus, the adjustment circuit may be manufactured in a relatively small size, and more accurate beam width control may be rendered possible.

Figure 7D:
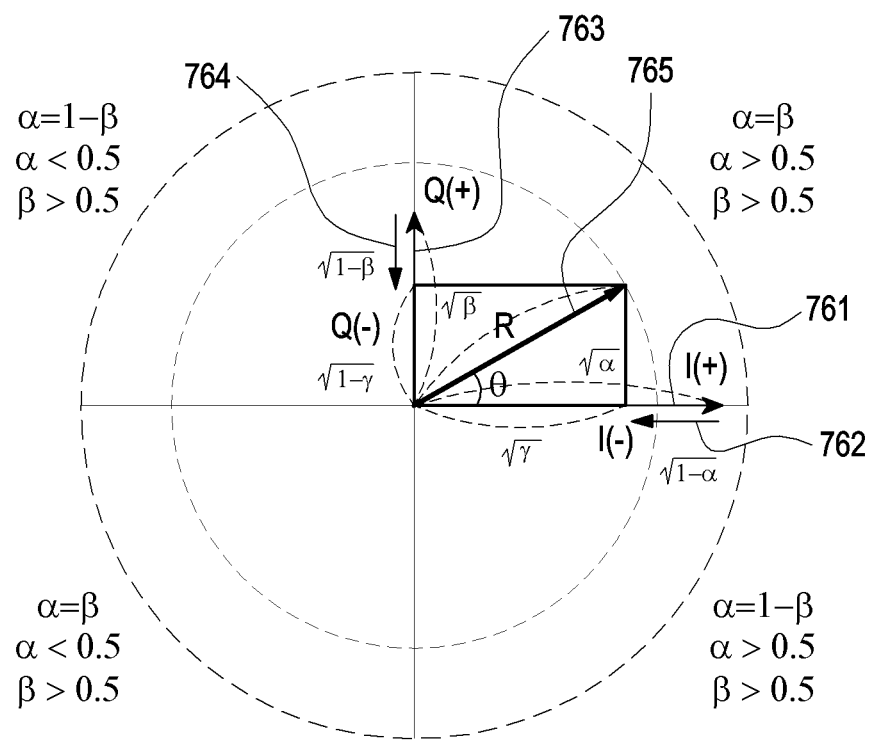

Referring to FIG. 7D, an I+ signal 761 and an I− signal 762 may be represented. The amplitude of the I+ signal 761 and the I− signal 762 may be obtained by Equation 1.

$$I(+):I(-)=\sqrt{(\alpha)}:\sqrt{(1-\alpha)}$$ [Equation 1]

α may be a real number not less than 0 and not more than 1 The wireless power transmitter 100 may adjust α. The amplitude of the summated signal on the real axis may be $\sqrt{(\gamma)}$. Further, the amplitude of the Q+ signal 763 and the Q− signal 764 may be obtained by Equation 2.

$$Q(+):Q(-)=\sqrt{(\beta)}:\sqrt{(1-\beta)}$$ [Equation 2]

β may be a real number not less than 0 and not more than 1. The wireless power transmitter 100 may adjust β. The amplitude of the summated signal on the imaginary axis may be $\sqrt{(1-\gamma)}$. Thus, the final summated signal 765 may have an amplitude of R and a phase of θ and may be represented as shown in Equations 3 and 4. In Equation 3, k may be a constant.

$$R = k\sqrt{(1-\alpha)\alpha} = k\sqrt{(1-\beta)\beta}$$ [Equation 3]

$$\theta = \tan^{-1}\frac{\sqrt{1-\gamma}}{\sqrt{\gamma}}$$ [Equation 4]

As set forth above, the wireless power transmitter 100 may adjust the amplitude R and the phase θ of the summated signal 765 by adjusting the amplitude of at least one of the I/Q signals 761, 762, 763, and 764.

Figure 7E:
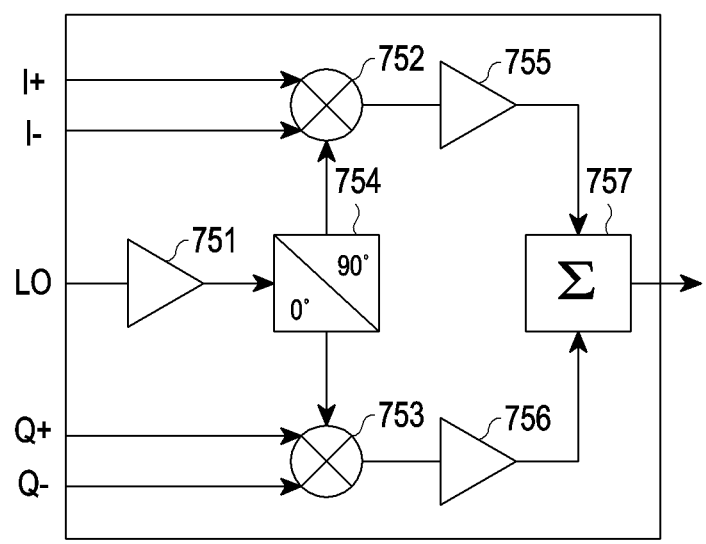
FIG. 7E is a circuit diagram illustrating a circuit for synthesis according to various embodiments.

FIG. 7E is a circuit diagram illustrating a circuit for synthesis according to various embodiments.

The circuit of synthesis of FIG. 7E may include, e.g., the combiner 714 and the balun 715 of FIG. 7B. A mixer 752 may receive a positive I signal I+ and a negative I signal I− whose amplitude has been adjusted by the I/Q amplification circuit 713. A mixer 753 may receive a positive Q signal Q+ and a negative Q signal Q− whose amplitude has been adjusted by the I/Q amplification circuit 713. A local oscillator (LO) may output a clock with a designated frequency and the clock may be amplified by the amplifier 751. A delay circuit 754 may receive the amplified clock, 90-degree delay the received clock, and provide the delayed signal to the mixer 752 through a first path, and the delay circuit 754 may provide, without delay, it to the mixer 753 via a second path. The mixer 752 may mix the positive I signal I+ and the negative I signal I− with the 90 degree-delayed clock and provide the result to the amplifier 755. The mixer 753 may mix the positive Q signal Q+ and the negative Q signal Q− with the delay-free clock and provide the result to the amplifier 756. The synthesis circuit 757 may synthesize the signal from the amplifier 755 and the signal from the amplifier 756 and output an output RF signal.

Figure 8:
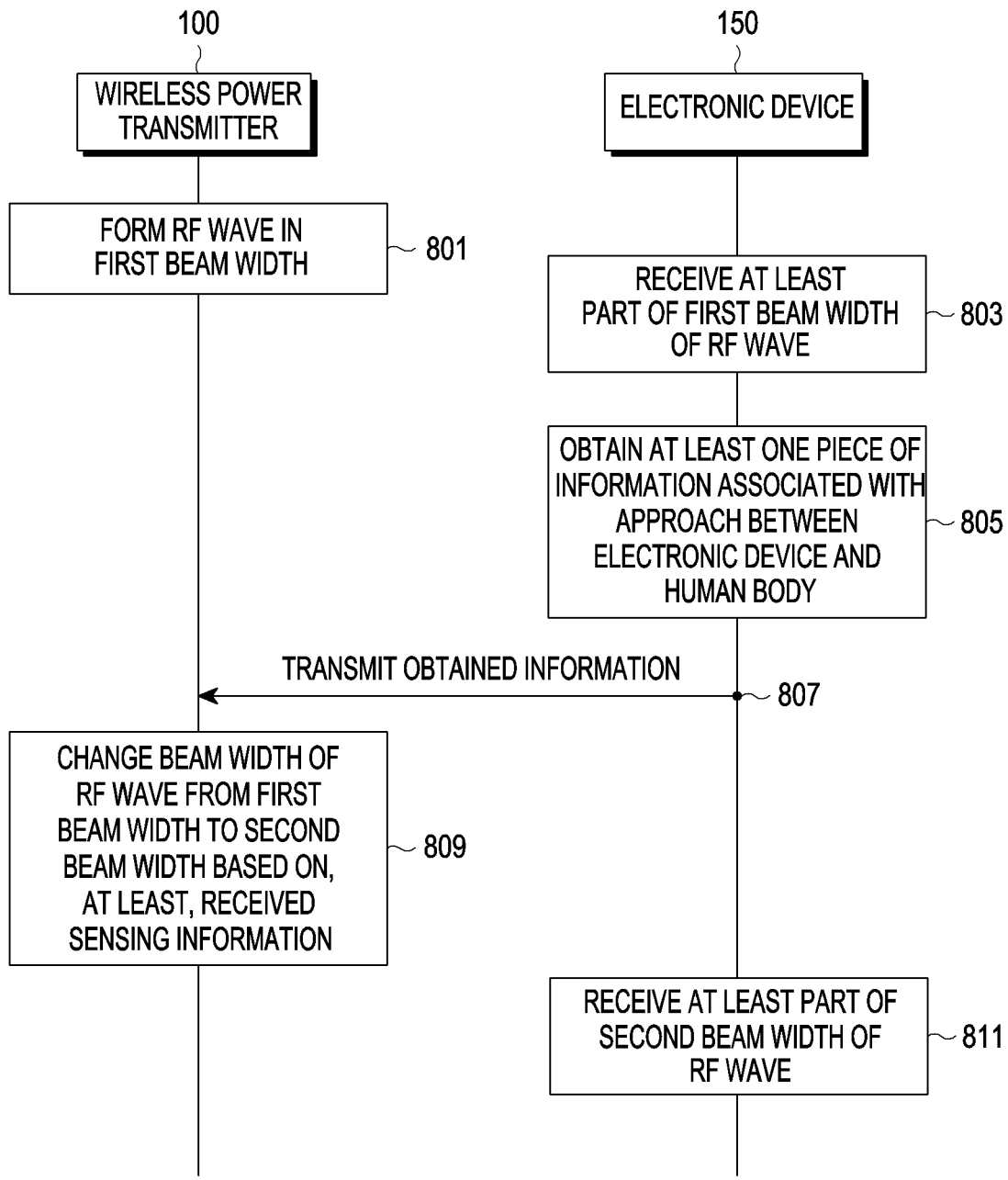
FIG. 8 is a flowchart illustrating a method of operating a wireless power transmitter and an electronic device according to various embodiments.
Figure 9:
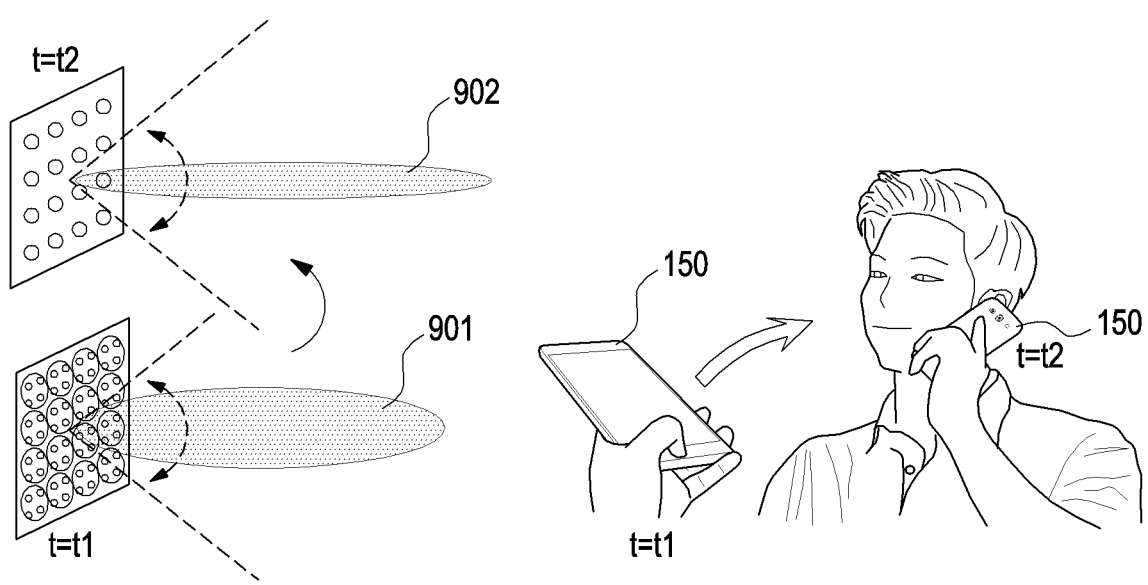
FIG. 9 illustrates an electronic device and a wireless power transmitter according to various embodiments.

FIG. 8 is a flowchart illustrating a method of operating a wireless power transmitter and an electronic device according to various embodiments. The embodiment shown in FIG. 8 is described in greater detail with reference to FIG. 9. FIG. 9 illustrates an electronic device and a wireless power transmitter according to various embodiments.

In operation 801, according to various embodiments, the wireless power transmitter 100 may produce an RF wave in a first beam width. In operation 803, the electronic device 150 may receive at least some of the first beam width of RF waves.

In operation 805, according to various embodiments, the electronic device 150 may obtain at least one piece of information associated with approach between the electronic device and the human body. According to an embodiment, the electronic device 150 may obtain information about an application that is running. For example, as shown in FIG. 9, the electronic device 150 may refrain from running a phone application at a first time t1 and may run the phone application at a second time t2. The electronic device 150 may run the phone application by the user's selection or may run the phone application based on an incoming signal from an external base station. Upon running the phone application, the user is highly likely to hold the electronic device 150 near his or her ear. In this case, if the beam width of RF waves formed by the wireless power transmitter 100 is relatively large, the RF waves may be directed to the user's head. Thus the wireless power transmitter 100 may form an RF wave 901 with a first beam width at a first time and then form an RF wave 902 with a second beam width at a second time. Specifically, in operation 807, the electronic device 150 may transmit obtained information to the wireless power transmitter 100. In operation 809, the wireless power transmitter 100 may change the beam width of RF wave from the first beam width to a second beam width based on, at least, the received information. In operation 811, the electronic device 150 may receive at least some of the second beam width of RF waves. The electronic device 150 may determine various pieces of information, e.g., whether the electronic device 150 and the user's body approach, the distance between the electronic device 150 and the user's body, or information about the user's body portion the electronic device 150 has approached, based on, at least, various pieces of information, such as whether Bluetooth communication is used, sensing data obtained from the proximity sensor, sensing data obtained from the ultrasonic sensor, and sensing data received through the touchscreen. The wireless power transmitter 100 may receive various pieces of information from the electronic device 150 and determine the beam width of RF wave based on, at least, the information.

According to various embodiments, the wireless power transmitter 100 may set a different beam width per body portion the electronic device 150 has approached. For example, there may be various protocols associated with the specific absorption rate (SAR), the electro-magnetic interference (EMI), electro-magnetic susceptibility (EMS), electro-magnetic compatibility (EMC), or maximum permissible exposure (MPE), and a beam width meeting the protocol may be experimentally pre-identified. The wireless power transmitter 100 may previously store information about the beam width per body portion approached, and may determine the beam width of RF wave based on, at least, the information received from the electronic device 150. Table 1 shows an example relationship between the beam width and the body portion approached by the electronic device 150 as previously stored.

TABLE 1

| body portion approached | beam width |
|---|---|
| body not touched | first beam width |
| head | second beam width |
| hand | third beam width |

Table 1 may be previously determined by the protocol associated with the above-described various factors and may be stored in the wireless power transmitter 100 or the electronic device 150. If the electronic device 150 stores the association information as shown in Table 1, the electronic device 150 may compare sensing data and the association information of Table 1 to thereby determine the beam width and may transmit information about the determined beam width to the wireless power transmitter 100. The wireless power transmitter 100 may determine the beam width of RF wave based on, at least, the received beam width information. Or, the electronic device 150 may store correlation information as set forth in Table 2.

TABLE 2

| distance between user's body and electronic device | beam width |
|---|---|
| first range | fourth beam width |
| second range | fifth beam width |
| third range | sixth beam width |

Table 2 may also be previously determined by the protocol associated with the above-described various factors and may be stored in the wireless power transmitter 100 or the electronic device 150. The wireless power transmitter 100 may compare the sensing data received from the electronic device 150 and the association information of Table 2 and determine the beam width of an RF wave based on, at least, the result of comparison. Or, the electronic device 150 may compare the sensing data and the association information of Table 2 and determine the beam width of RF wave based on, at least, the result of comparison. The electronic device 150 may transmit information about the determined beam width to the wireless power transmitter 100.

Meanwhile, the wireless power transmitter 100 may store the correlation between the beam width and the information (e.g., phone application execution information) received from the electronic device 150, rather than the correlation between the beam width and the distance or approached body portion. The wireless power transmitter 100 may store the correlation between the number of patch antennas included in one group and the approached body portion. Or, the wireless power transmitter 100 may store the correlation between the number of patch antennas included in one group and information (e.g., phone application execution information) received from the electronic device 150.

According to various embodiments, the electronic device 150 may obtain various pieces of information for determining approach to the body as well as the information associated with the execution of the application. According to an embodiment, the electronic device 150 may determine whether the body contacts the electronic device 150 using a proximity sensor. The electronic device 150 may transmit information about whether the body contacts to the wireless power transmitter 100, and the wireless power transmitter 100 may determine the beam width of RF wave based on, at least, the received information as to whether the body contacts the electronic device 150. According to an embodiment, the electronic device 150 may determine information about the distance between the body and the electronic device 150 using a gesture sensor. The electronic device 150 may transmit the determined information about the distance between the body and the electronic device 150 to the wireless power transmitter 100, and the wireless power transmitter 100 may determine the beam width of RF wave based on, at least, the received distance between the electronic device 150 and the body.

Figure 10:
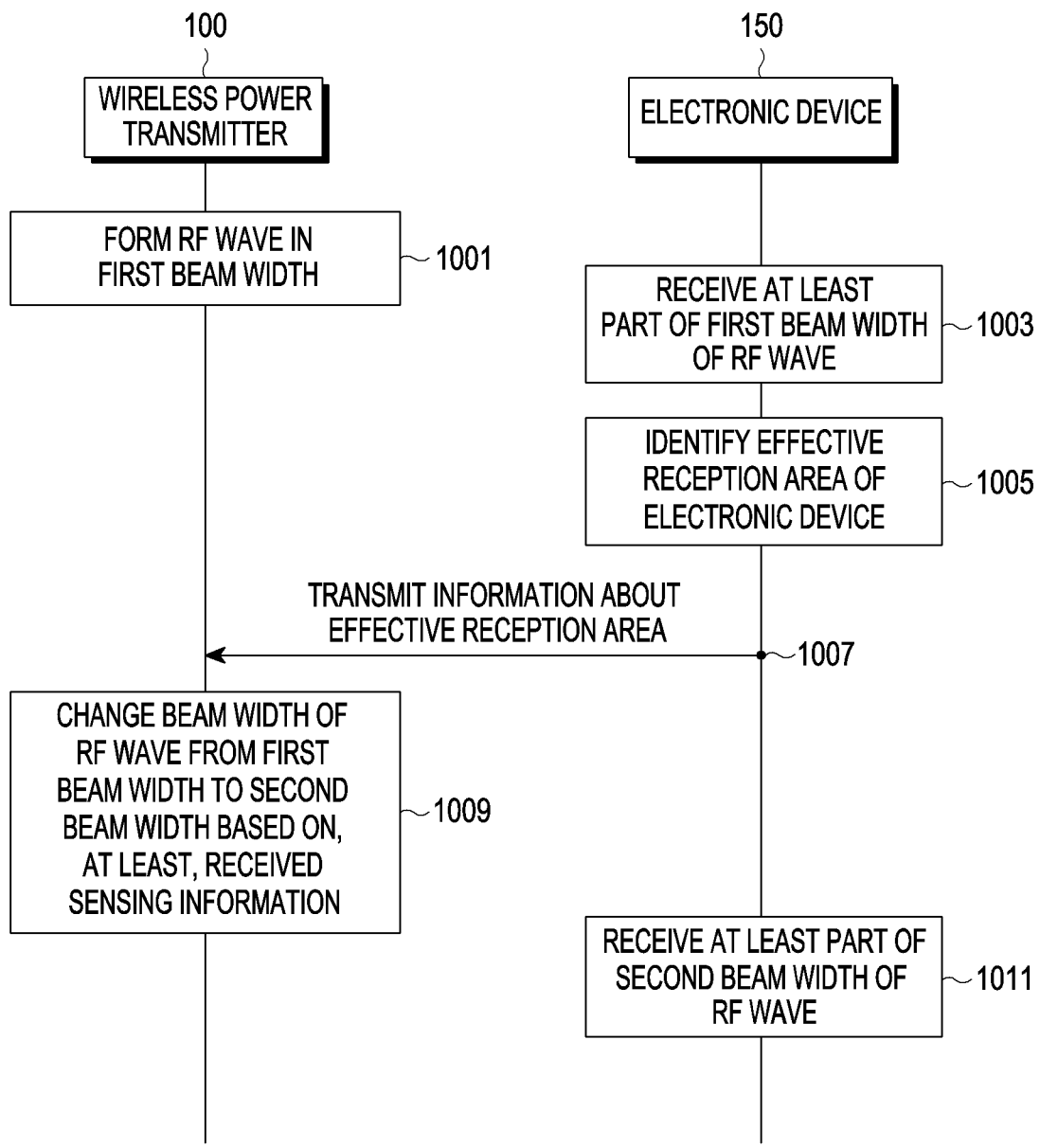
FIG. 10 is a flowchart illustrating a method of operating a wireless power transmitter and an electronic device according to various embodiments.
Figure 11:
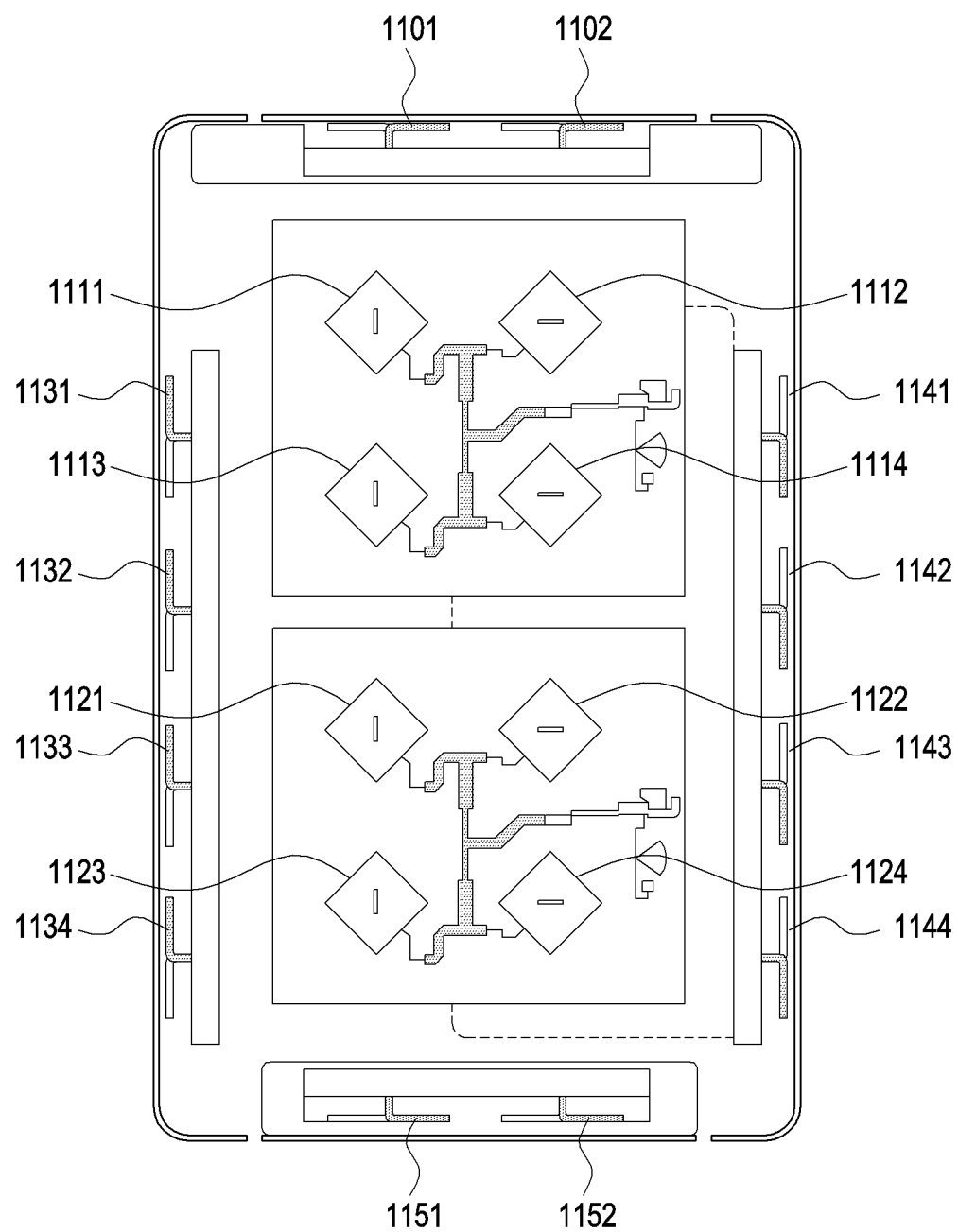
FIG. 11 illustrates a patch antenna for power reception in an electronic device according to various embodiments.

FIG. 10 is a flowchart illustrating a method of operating a wireless power transmitter and an electronic device according to various embodiments. The embodiment shown in FIG. 10 is described in greater detail with reference to FIG. 11. FIG. 11 illustrates a patch antenna for power reception in an electronic device according to various embodiments.

In operation 1001, according to various embodiments, the wireless power transmitter 100 may produce an RF wave in a first beam width. In operation 1003, the electronic device 150 may receive at least some of the first beam width of RF waves. In operation 1005, the electronic device 150 may identify the effective reception area of the electronic device 150. For example, as shown in FIG. 11, according to various embodiments, the electronic device 150 may include patch antennas 1111, 1112, 1113, 1114, 1121, 1122, 1123, and 1124 for power reception which are arranged on the front surface of the electronic device 150. The power reception patch antennas 1111, 1112, 1113, and 1114 may be arranged on a first substrate 1110, and the power reception patch antennas 1121, 1122, 1123, and 1124 may be arranged on a second substrate 1112. Although not shown, the same number of power reception patch antennas may be arranged on the back surface of the electronic device 150. The electronic device 150 may include power reception patch antennas 1131, 1132, 1133, 1134, 1141, 1142, 1143, and 1144 arranged on the side surface. The electronic device 150 may include power reception patch antennas 1101 and 1102 arranged on the top surface of the electronic device 150. The electronic device 150 may include power reception patch antennas 1151 and 1152 arranged on the bottom surface of the electronic device 150. The electronic device 150 may determine the effective reception area based on, at least, the number of antennas outputting a magnitude of power exceeding a threshold among the power reception patch antennas. The threshold may be a preset value or the threshold may be set based on, at least, the maximum magnitude of power output from the antennas. This is described below in greater detail with reference to FIG. 12. For example, if the bottom surface of the electronic device 150 is substantially perpendicular to the RF wave, the electronic device 150 may determine that the magnitude of power output from the power reception patch antennas 1151 and 1152 exceeds the threshold and, thus, determine the effective reception area corresponding to the number of patch antennas, i.e., two. In operation 1007, the electronic device 150 may transmit information about the effective reception area. In operation 1009, the wireless power transmitter 100 may change the beam width of RF wave from the first beam width to a second beam width based on, at least, the received information. For example, the wireless power transmitter 100 may determine the beam width based on, at least, the effective reception area corresponding to the two as received. The wireless power transmitter 100 may determine the beam width further using at least one of the body approach information about the electronic device 150 or the distance between the wireless power transmitter 100 and the electronic device 150. In operation 1011, the electronic device 150 may receive at least some of the second beam width of RF waves. Upon determining that the effective reception area is a predesignated value or less, the electronic device 150 may display a graphic object to lead the electronic device 150 to change its posture so as to expand the effective reception area.

Figure 12:
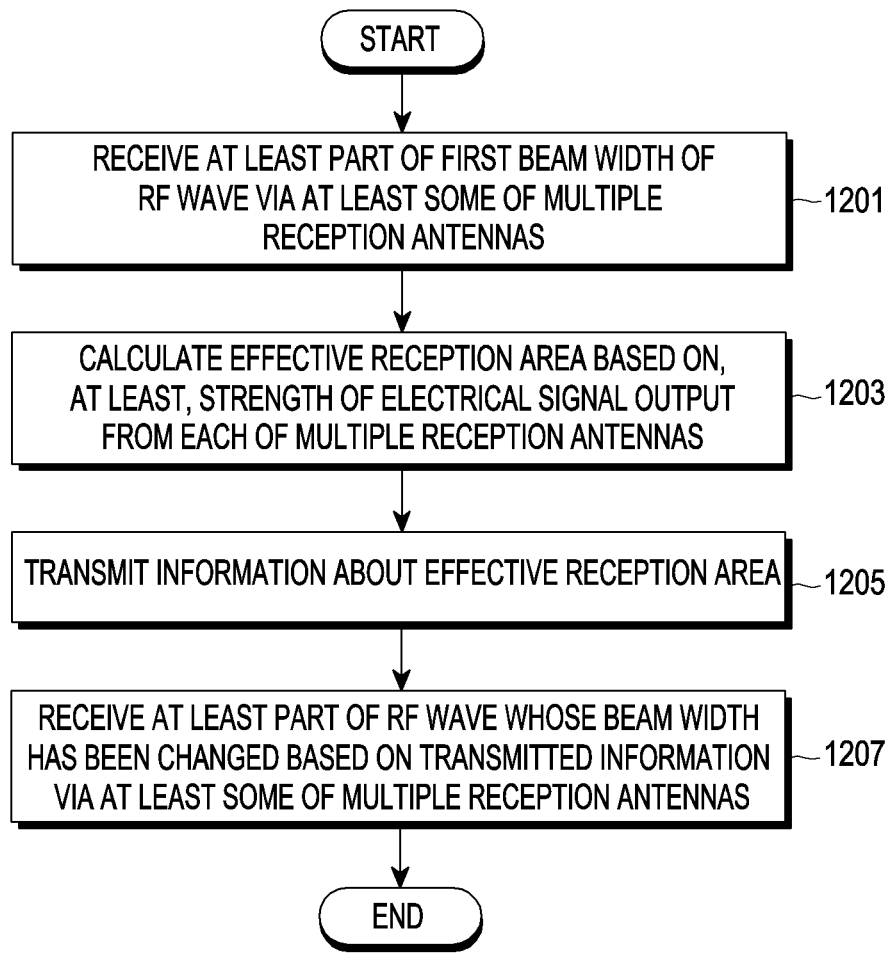
FIG. 12 is a flowchart illustrating a method for operating a wireless power transmitter According to various embodiments.

FIG. 12 is a flowchart illustrating a method for operating a wireless power transmitter according to various embodiments.

In operation 1201, according to various embodiments, the electronic device 150 may receive at least some of a first beam width of RF waves through at least some of a plurality of power reception patch antennas. For example, at least some of the plurality of power reception patch antennas as shown in FIG. 11 may convert at least some of the RF waves into DC power and output the DC power. In operation 1203, the electronic device 150 may calculate the effective reception area based on, at least, the strength of electrical signal output from each of the plurality of power reception patch antennas. The electronic device 150 may identify the maximum magnitude of the power output from the plurality of reception antennas. The electronic device 150 may identify that the maximum magnitude of power (e.g., a) is output from the antenna 1151 in FIG. 11. The electronic device 150 may set, e.g., ½ of the maximum power output from the power reception patch antenna to the threshold. The electronic device 150 may determine the effective reception area based on the area (or number) of antennas which exceeds the threshold of a/2. Thus, the electronic device 150 may dynamically vary the threshold, without setting a fixed threshold, and the electronic device 150 may thus determine a meaningful effective reception area even in the environment where a relatively small magnitude of power is received. In operation 1205, the electronic device 150 may transmit information about the effective reception area to the wireless power transmitter 100, and the wireless power transmitter 100 may vary the beam width of RF wave based on, at least, the received effective reception area information. In operation 1207, the electronic device 150 may receive at least some of the RF waves whose beam width has been varied based on the transmitted information, via at least some of the plurality of power reception patch antennas. As described above, the electronic device 150 may set the threshold for determining the effective reception area based on, at least, the output strength from at least one among the power reception patch antennas.

Figure 13:
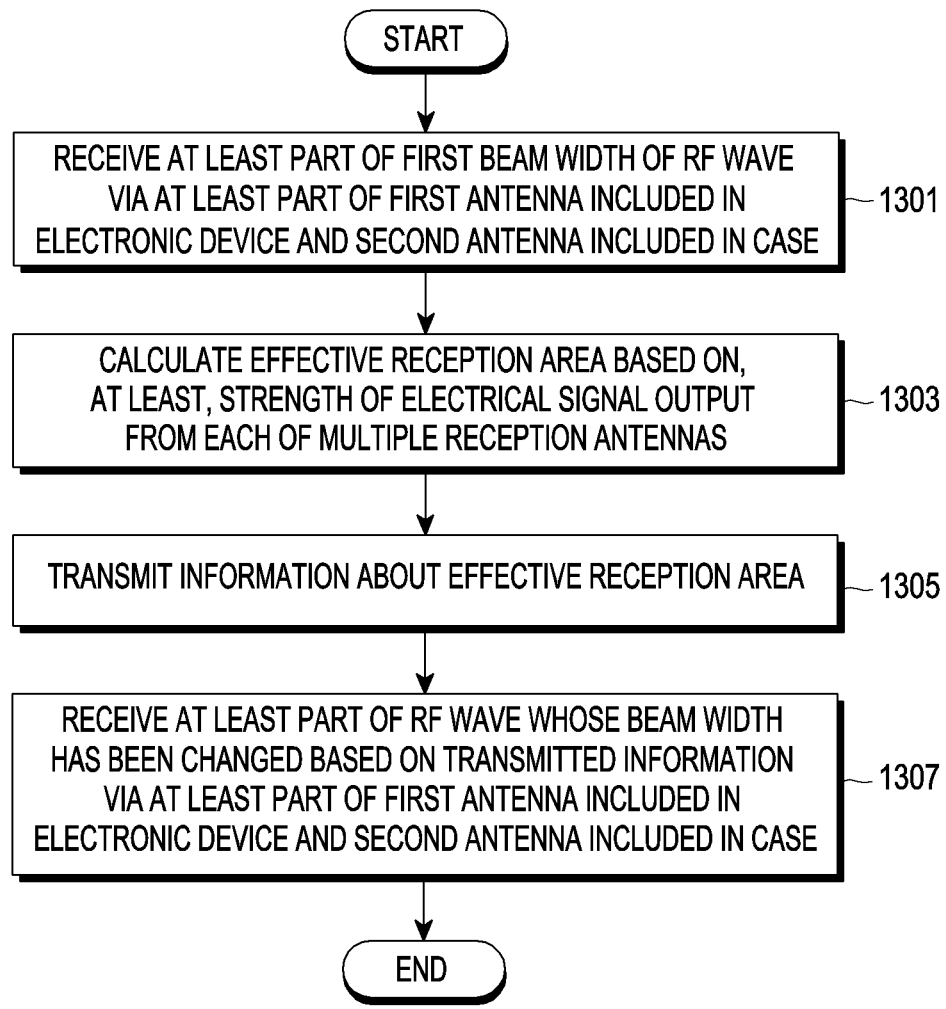
FIG. 13 is a flowchart illustrating a method of operating an electronic device connected to a case including a flip cover according to various embodiments.
Figure 14:
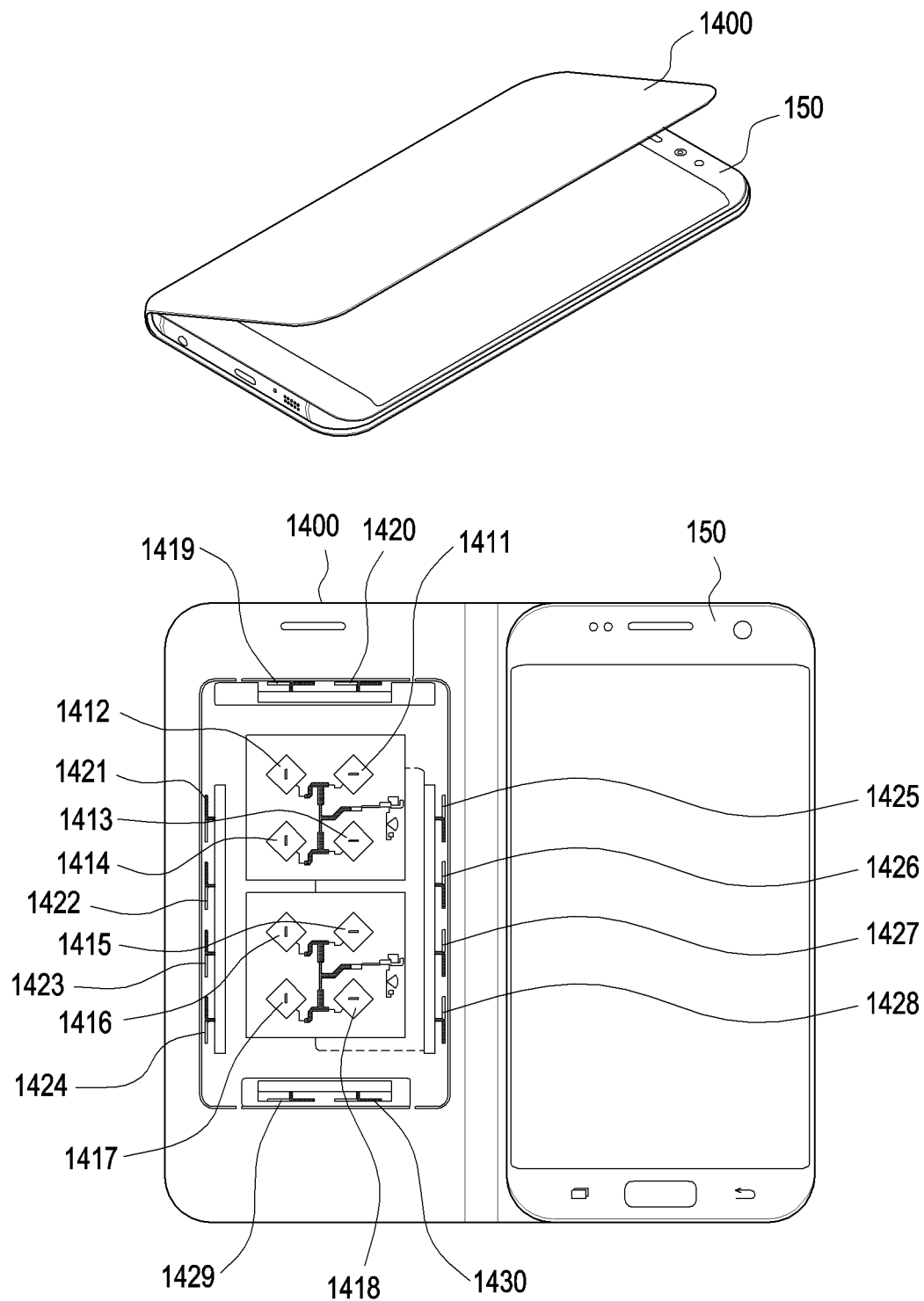
FIG. 14 illustrates an electronic device connected to a case including a flip cover according to various embodiments.

FIG. 13 is a flowchart illustrating a method of operating an electronic device connected to a case including a flip cover according to various embodiments. The embodiment related to FIG. 13 is described in greater detail with reference to FIG. 14. FIG. 14 illustrates an electronic device connected to a case including a flip cover according to various embodiments.

In operation 1301, according to various embodiments, the electronic device 150 may receive at least some of a first beam width of RF waves through at least part of a first antenna included in the electronic device and a second antenna included in the case. Referring to FIG. 14, the electronic device 150 may be seated in a case 1400 including a flip cover. The flip cover may be open or closed. If the flip cover closes, it may hide the front surface of the electronic device 150 and, if the flip cover opens, the front surface of the electronic device 150 may be exposed. The flip cover may include at least one power reception patch antenna 1411, 1412, 1413, 1414, 1415, 1416, 1417, 1418, 1419, 1420, 1421, 1422, 1423, 1424, 1425, 1426, 1427, 1428, 1429, and 1430. The at least one power reception patch antenna 1411, 1412, 1413, 1414, 1415, 1416, 1417, 1418, 1419, 1420, 1421, 1422, 1423, 1424, 1425, 1426, 1427, 1428, 1429, and 1430 may be electrically connected to the electronic device 150. According to an embodiment, the at least one power reception patch antenna 1411, 1412, 1413, 1414, 1415, 1416, 1417, 1418, 1419, 1420, 1421, 1422, 1423, 1424, 1425, 1426, 1427, 1428, 1429, and 1430 of the case 1400 may include a rectification circuit and a converter in which case the at least one power reception patch antenna 1411, 1412, 1413, 1414, 1415, 1416, 1417, 1418, 1419, 1420, 1421, 1422, 1423, 1424, 1425, 1426, 1427, 1428, 1429, and 1430 may be connected to a charger or PMIC of the electronic device 150. According to an embodiment, the at least one power reception patch antenna 1411, 1412, 1413, 1414, 1415, 1416, 1417, 1418, 1419, 1420, 1421, 1422, 1423, 1424, 1425, 1426, 1427, 1428, 1429, and 1430 of the case 1400 may include only a radiator outputting AC power using RF waves in which case the at least one power reception patch antenna 1411, 1412, 1413, 1414, 1415, 1416, 1417, 1418, 1419, 1420, 1421, 1422, 1423, 1424, 1425, 1426, 1427, 1428, 1429, and 1430 may be connected to a rectification circuit of the electronic device 150.

In operation 1303, the electronic device 150 may calculate the effective reception area based on, at least, the strength of electrical signal output from each of the plurality of power reception patch antennas. As set forth above, the electronic device 150 may calculate the effective reception area based on, at least, the area (or number) of power reception antennas outputting the power which exceeds a threshold preset or dynamically set. The electronic device 150 may calculate the effective reception area based on, at least, whether the flip cover opens or closes. As shown in FIG. 14, if the flip cover opens, the effective reception area may be relatively large. The electronic device 150 may determine whether the flip cover opens or closes using sensing data from a hall sensor and determine the effective reception area based on, at least, whether the flip cover opens or closes. In operation 1305, the electronic device 150 may transmit information about the effective reception area to the wireless power transmitter 100. In operation 1307, the electronic device 150 may receive at least some of RF waves whose beam width has been changed based on the transmitted information through at least part of a first antenna included in the electronic device and a second antenna included in the case.

Figure 15:
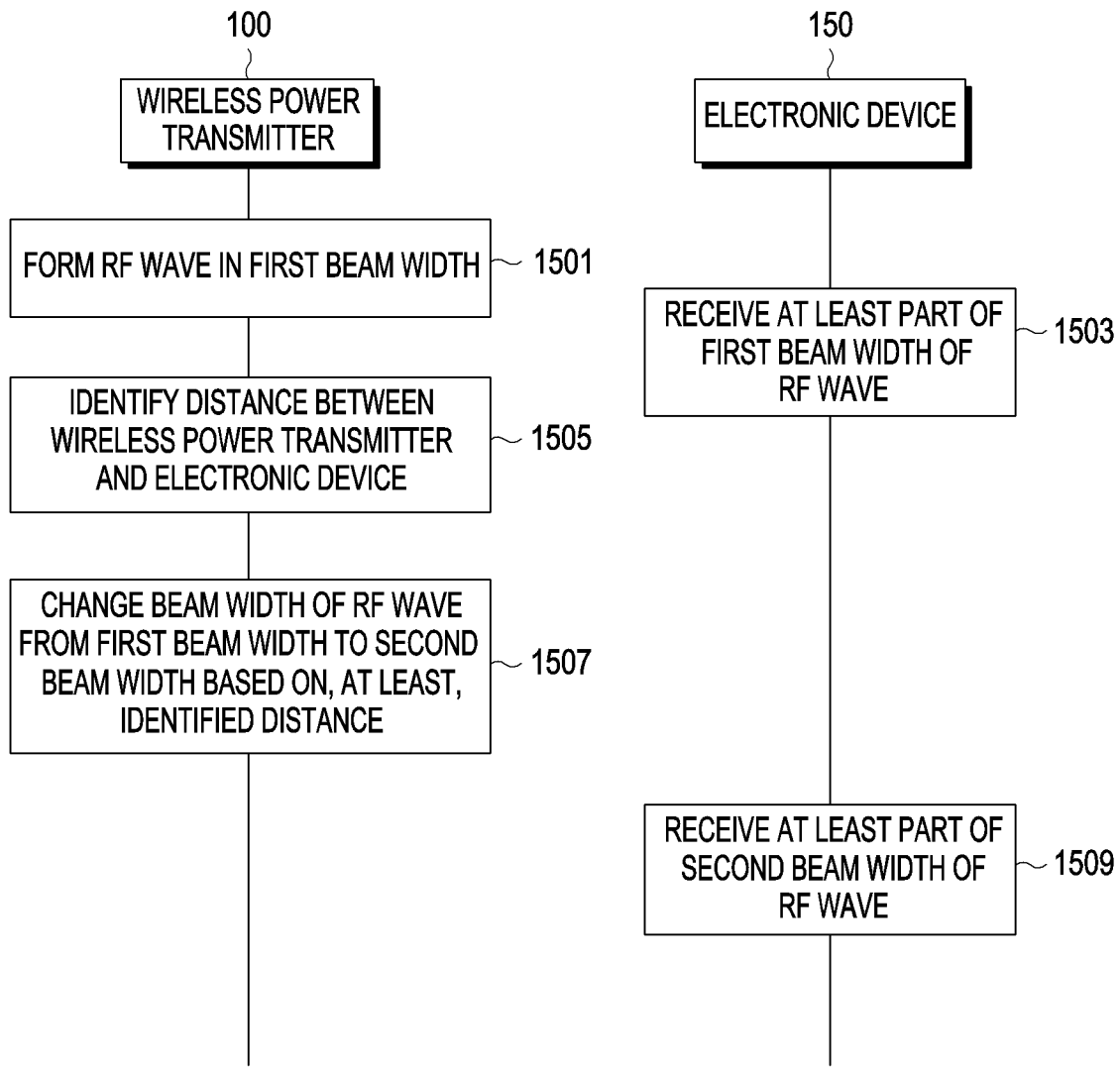
FIG. 15 is a flowchart illustrating a method of operating a wireless power transmitter and an electronic device according to various embodiments.
Figure 16:
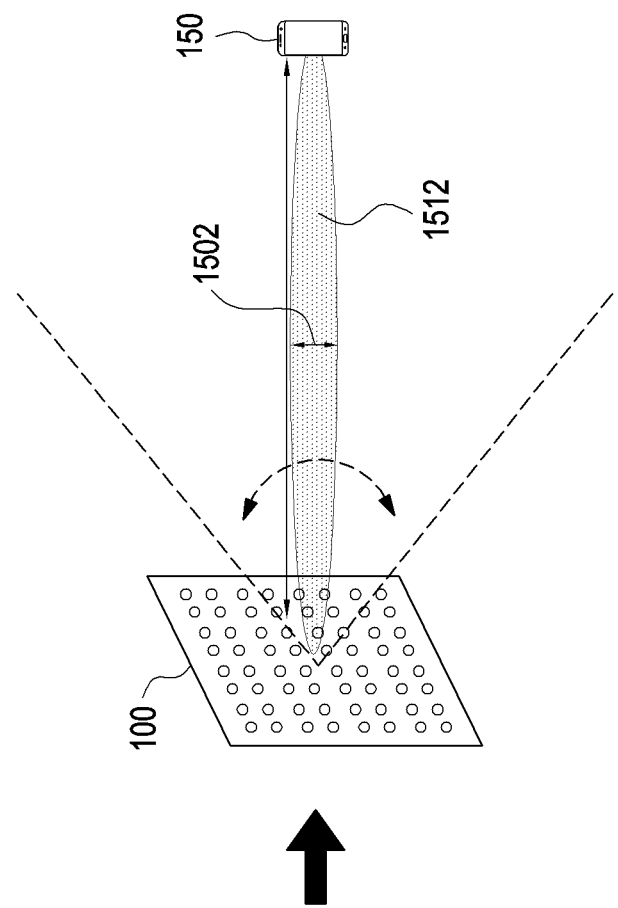
FIG. 16 illustrates a wireless power transmitter and an electronic device according to various embodiments.
Figure 16:
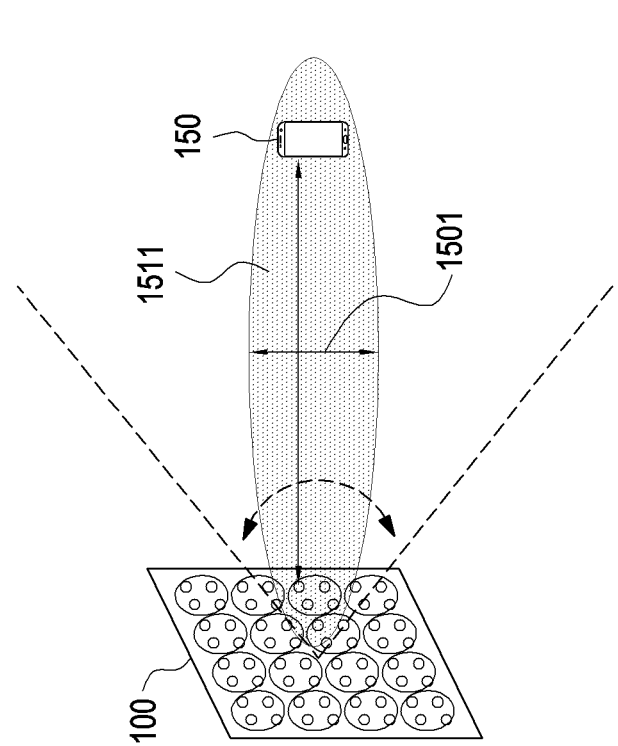

FIG. 15 is a flowchart illustrating a method of operating a wireless power transmitter and an electronic device according to various embodiments. An embodiment is described in detail with reference to FIG. 15 along with FIG. 16. FIG. 16 illustrates a wireless power transmitter and an electronic device according to various embodiments.

In operation 1501, according to various embodiments, the wireless power transmitter 100 may produce an RF wave in a first beam width. In operation 1503, the electronic device 150 may receive at least some of the first beam width of RF waves. In operation 1505, the wireless power transmitter 100 may identify the distance between the wireless power transmitter 100 and the electronic device 150. As described above, the wireless power transmitter 100 may identify the distance using a communication signal from the electronic device 150. For example, the wireless power transmitter 100 may identify the distance using, e.g., a time stamp for the time of transmission included in the communication signal or the strength of transmission included in the communication signal. Or, the wireless power transmitter 100 may identify the distance based on vision recognition. Or, the wireless power transmitter 100 may receive information about the position measured by the electronic device 150 and identify the distance using the measured position information. Or, the wireless power transmitter 100 may identify the distance using information received from an electronic device 150 other than the electronic device 150. Or, the wireless power transmitter 100 may receive information about the reception magnitude of RF wave from the electronic device 150 and compare the transmission magnitude of RF wave and the received reception magnitude of RF wave, thereby identifying the distance. In this case, the electronic device 150 may identify the distance based on, at least, the reception magnitude of RF wave and transmit the identified distance to the wireless power transmitter 100.

In operation 1507, the wireless power transmitter 100 may change the beam width of RF wave from a first beam width to a second beam width based on, at least, the identified distance. For example, as shown in FIG. 16, if the identified distance belongs to a first range, the wireless power transmitter 100 may form an RF wave 1511 with a first beam width 1501. If the identified distance belongs to a second range, the wireless power transmitter 100 may form an RF wave 1512 with a second beam width 1502. In operation 1509, the electronic device 150 may receive at least some of the second beam width of RF waves.

Figure 17A:
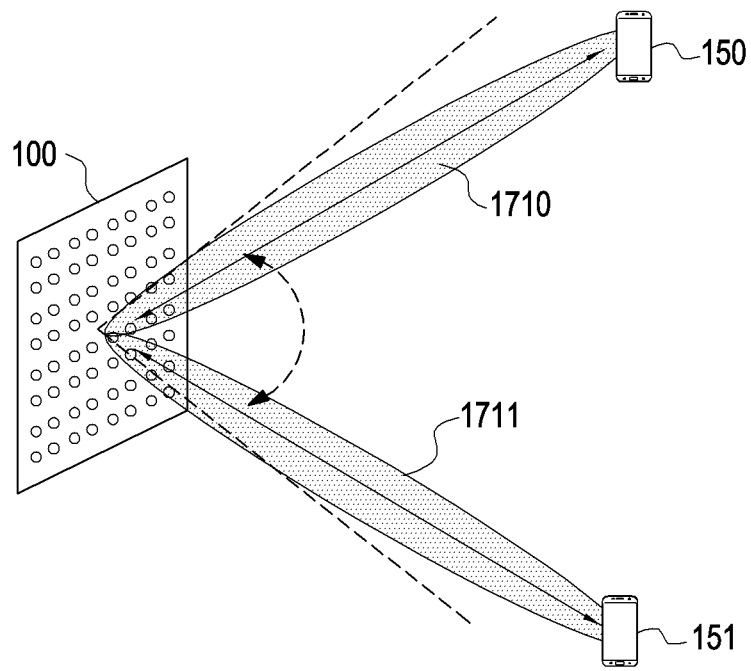
FIGS. 17A to 17C illustrate a wireless power transmitter to charge a plurality of electronic devices according to various embodiments.
Figure 17B:
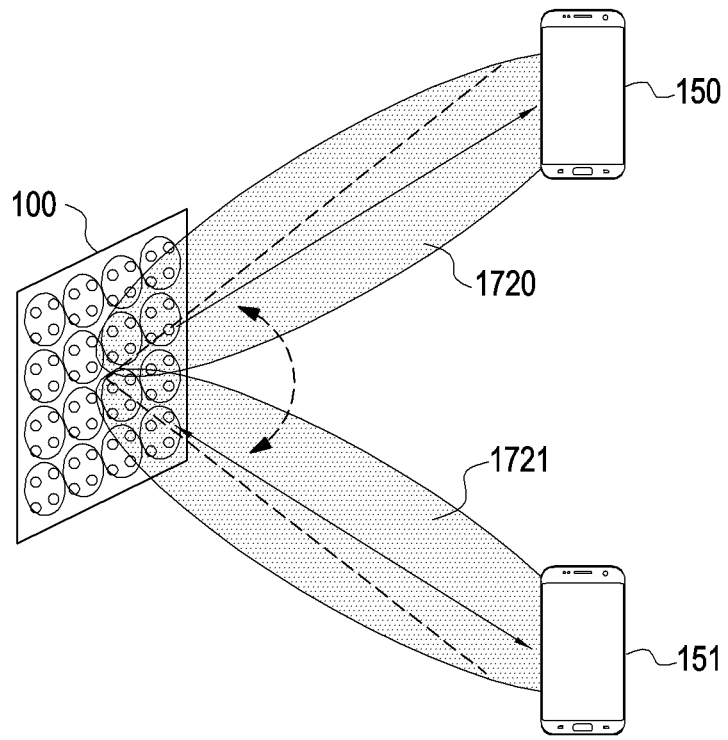
Figure 17C:
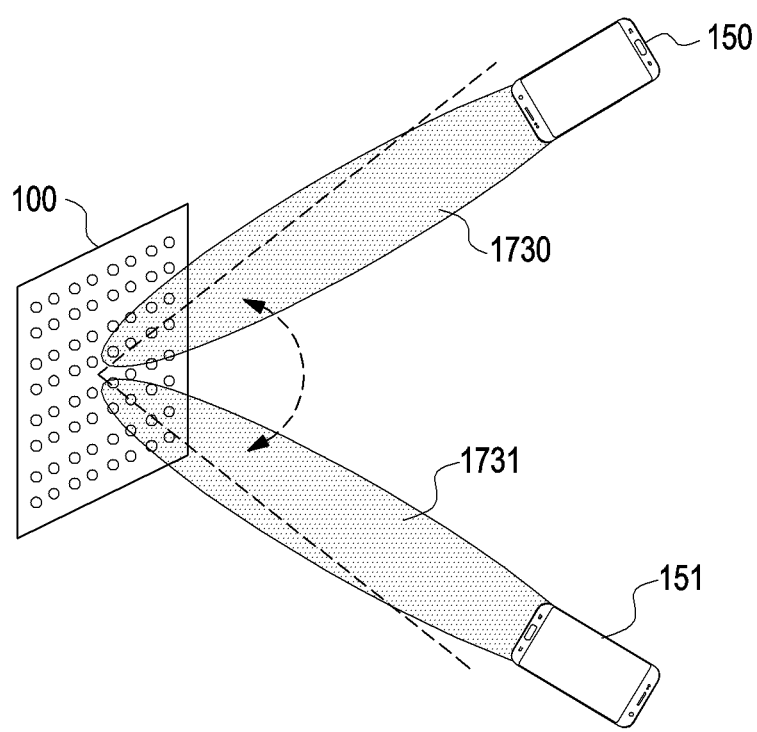

FIGS. 17A to 17C illustrate a wireless power transmitter to charge a plurality of electronic devices according to various embodiments.

Referring to FIG. 17A, the wireless power transmitter 100 may form a first beam width of RF waves 1710 and 1711 towards electronic devices 150 and 151 that are relatively far away. Referring to FIG. 17B, the wireless power transmitter 100 may form a second beam width of RF waves 1710 and 1711 towards electronic devices 150 and 151 that are relatively close. The first beam width may be relatively smaller than the second beam width. Thus, the number of patch antennas included in one group may be smaller in the case of FIG. 17A than in the case of FIG. 17B. The circle mark in the wireless power transmitter 100 of FIGS. 17A and 17B may indicate the size of group. The wireless power transmitter 100 may sequentially form RF waves towards the plurality of electronic devices 150 and 151 according to time division. For example, the wireless power transmitter 100 may form an RF wave towards the electronic device 150 during a first period and an RF wave towards the electronic device 151 during a second period. Although not shown, the effective reception area of the electronic device 150 may differ from the effective reception area of the electronic device 151. In this case, the wireless power transmitter 100 may form a first beam width of RF wave towards the electronic device 150 during the first period and a second beam width of RF wave towards the electronic device 151 during the second period. According to another embodiment, the wireless power transmitter 100 may form RF waves towards the electronic device 150 using some first patch antennas among the plurality of patch antennas and RF waves towards the electronic device 151 using some second patch antennas among the plurality of patch antennas. In this case, the beam width of RF waves formed from the first patch antennas and the beam width of RF waves formed from the second patch antennas may be identical to or different from each other. Referring to FIG. 17C, the posture of the electronic devices 150 and 151 may be varied, so that the effective reception area of the electronic devices 150 and 151 may be changed. The wireless power transmitter 100 may receive a communication signal including information about the change in posture or effective reception area from the electronic devices 150 and 151. The wireless power transmitter 100 may form RF waves 1730 and 1731 with a beam width adjusted based on, at least, the received information.

Figure 18:
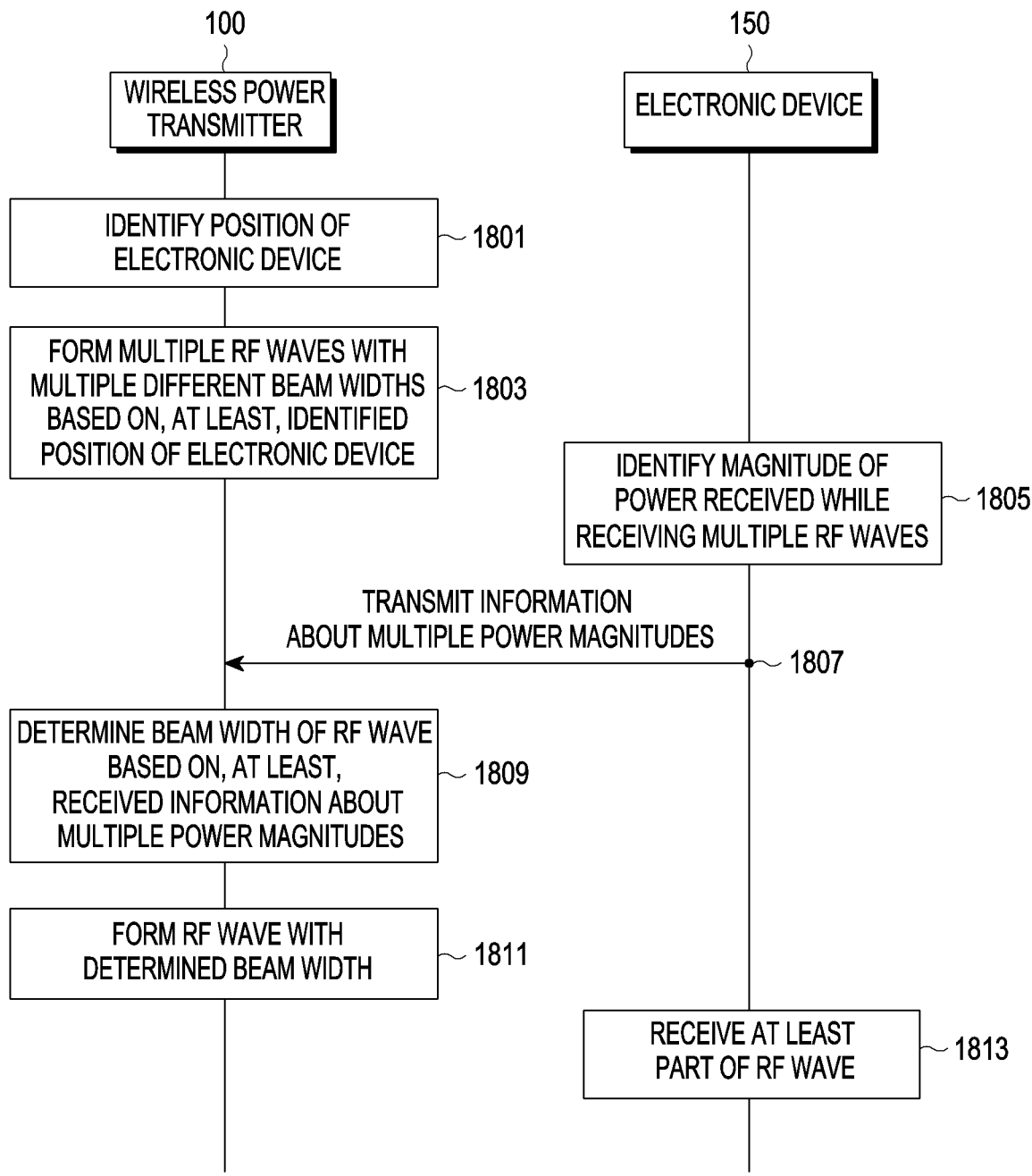
FIG. 18 is a flowchart illustrating a method of operating a wireless power transmitter and an electronic device according to various embodiments.
Figure 19:
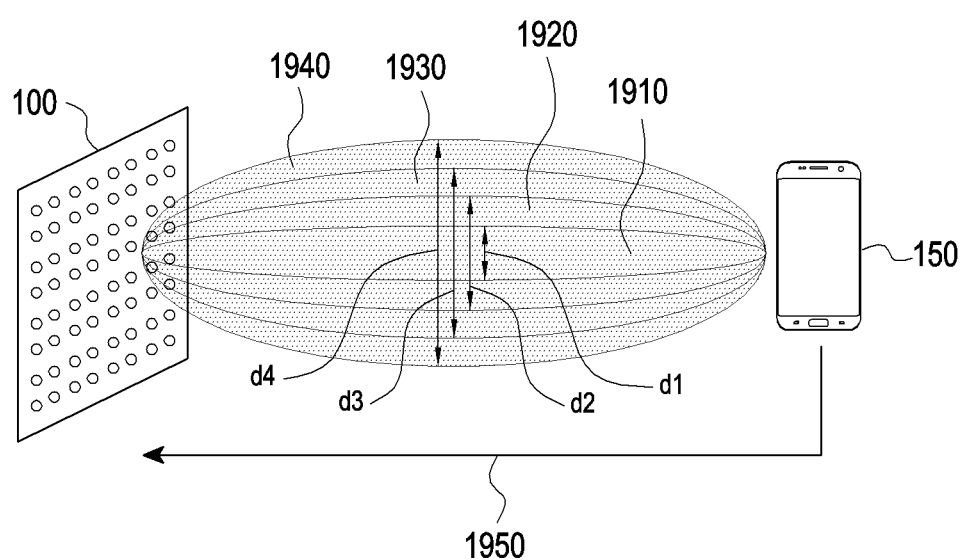
FIG. 19 illustrates a wireless power transmitter and an electronic device according to various embodiments.

FIG. 18 is a flowchart illustrating a method of operating a wireless power transmitter and an electronic device according to various embodiments. The embodiment shown in FIG. 18 is described in greater detail with reference to FIG. 19. FIG. 19 illustrates a wireless power transmitter and an electronic device according to various embodiments.

In operation 1801, according to various embodiments, the wireless power transmitter 100 may identify the position of the electronic device 150. In operation 1803, the wireless power transmitter 100 may form a plurality of RF waves with a plurality of different beam widths based on, at least, the identified position of the electronic device. For example, as shown in FIG. 19, the wireless power transmitter 100 may form an RF wave 1910 of a first beam width d1 during a first period, an RF wave 1920 of a second beam width d2 during a second period, an RF wave 1930 of a third beam width d3 during a third period, and an RF wave 1940 of a fourth beam width d4 during a fourth period. In operation 1805, the wireless power transmitter 100 may receive the plurality of RF waves while identifying the magnitude of received power. In operation 1807, the electronic device may transmit a plurality of pieces of power magnitude information to the wireless power transmitter 100. The electronic device 150 may include the received power magnitude in a communication signal 1950 and transmit the communication signal 1950 to the wireless power transmitter 100. According to an embodiment, the electronic device 100 may include pieces of information about the received strengths of the plurality of RF waves 1910, 1920, 1930, and 1940 in one communication signal and transmit the communication signal to the wireless power transmitter 100. According to another embodiment, the electronic device 100 may include the pieces of information about the received strengths of the plurality of RF waves 1910, 1920, 1930, and 1940 individually in different communication signals and transmit the communication signals to the wireless power transmitter 100. In operation 1809, the wireless power transmitter 100 may determine the beam width of RF wave based on, at least, the plurality of pieces of power magnitude information received. For example, the wireless power transmitter 100 may determine that the beam width corresponding to the maximum reception strength is the beam width of RF wave. In operation 1811, the wireless power transmitter 100 may form RF waves with the determined beam width. In operation 1813, the wireless power transmitter 100 may receive at least some of the RF waves. According to various embodiments, the wireless power transmitter 100 may determine the beam width of RF waves based on the above-described scheme and may dynamically vary the beam width based on, at least, sensing data received from the electronic device 150 thereafter.

Various embodiments as set forth herein may be implemented as software containing commands that are stored in a machine (e.g., computer)-readable storage medium (e.g., an internal memory or an external memory). The machine may be a device that may invoke a command stored in the storage medium and may be operated as per the invoked command. The machine may include an electronic device (e.g., the electronic device 150) according to embodiments disclosed herein. When the command is executed by a processor, the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to various embodiments, there is provided a storage medium storing instructions configured to, when executed by at least one processor, enable the at least one processor to perform at least one operation including controlling to form a first beam width of RF wave via a plurality of patch antennas, receiving sensing data about at least one of the motion of the electronic device or the posture of the electronic device, and adjusting the beam width of the RF wave formed by the plurality of patch antennas from the first beam width to a second beam width based on, at least, the received sensing data.

Or, the at least one operation may include controlling to receive at least part of the first beam width of RF wave formed from the wireless power transmitter via the plurality of patch antennas, obtaining sensing data about at least one of the motion of the electronic device or the posture of the electronic device, transmitting the sensing data to the wireless power transmitter, and controlling to receive at least part of the RF wave whose beam width has been adjusted from the first beam width to the second beam width via the plurality of patch antennas.

Or, the at least one operation may include receiving an input RF signal, generating a differential signal corresponding to the input RF signal, generating a positive I signal, a negative I signal, a positive Q signal, and a negative Q signal corresponding to the differential signal, adjusting the amplitude of at least one of the positive I signal, the negative I signal, the positive Q signal, or the negative Q signal based on, at least, the position of an electronic device to receive power, generating synthesized differential signals by synthesizing the positive I signal, the negative I signal, the positive Q signal, and the negative Q signal the amplitude of at least one of which has been adjusted, and controlling to output an output RF signal by synthesizing the synthesized differential signals.

The above-described commands may be stored in an external server and may be downloaded and installed on an electronic device, such as a wireless power transmitter. In other words, according to various embodiments, the external server may store commands that are downloadable by the wireless power transmitter.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

The invention claimed is:

1. A wireless power transmitter, comprising:
a plurality of patch antennas;
a communication circuit; and
a processor configured to:
control the wireless power transmitter to form an RF wave of a first beam width via the plurality of patch antennas,
receive sensing data about a posture of an electronic device associated with rotation of the electronic device via the communication circuit from the electronic device, and
adjust a beam width of the RF wave formed by the plurality of patch antennas from the first beam width to a second beam width based on, at least, the received sensing data.

2. The wireless power transmitter of claim 1, wherein the processor is further configured to:
identify an effective reception area in which the electronic device receives the RF wave, and
identify the second beam width of the RF wave based on, at least, the effective reception area.

3. The wireless power transmitter of claim 2, wherein the processor is further configured to:
identify the effective reception area based on, at least, the posture associated with rotation of the electronic device.

4. The wireless power transmitter of claim 2, wherein the processor is further configured to:
receive information about a reception strength in each of a plurality of circuits of the electronic device for receiving the RF wave via the communication circuit, and
identify the effective reception area based on, at least, the information about the reception strength in each of the plurality of circuits of the electronic device.

5. The wireless power transmitter of claim 2, wherein the processor is further configured to:
identify a distance between the electronic device and the wireless power transmitter, and
identify the effective reception area based on, at least, the distance between the electronic device and the wireless power transmitter.

6. The wireless power transmitter of claim 1, wherein the processor is further configured to:
receive information about an effective reception area in which the electronic device receives the RF wave via the communication circuit, and
identify the second beam width of the RF wave based on, at least, the information about the effective reception area.

7. The wireless power transmitter of claim 1, wherein the processor is further configured to:
receive information about approach of the electronic device to at least a body portion via the communication circuit, and
identify the second beam width of the RF wave based on, at least, the information about approach of the electronic device to at least the body portion.

8. The wireless power transmitter of claim 1, wherein the processor is further configured to:
bundle the plurality of patch antennas into at least one patch antenna group each of which includes a designated number of patch antennas, and
adjust a degree of adjustment of at least one of an amplitude or phase to be identical for at least one electrical signal input to at least one patch antenna included in the patch antenna group,
wherein the designated number is identified based on, at least, the beam width of the RF wave.

9. The wireless power transmitter of claim 8, wherein the processor is further configured to:
increase a number of patch antennas included in each of the at least one patch antenna group based on, at least, the second beam width larger than the first beam width, and decrease the number of patch antennas included in each of the at least one patch antenna group based on, at least, the second beam width smaller than the first beam width.

10. The wireless power transmitter of claim 1, further comprising an adjustment circuit,
wherein the adjustment circuit is configured to:
adjust at least one of a phase or amplitude of each of a plurality of electrical signals individually input to the plurality of patch antennas, and
wherein the processor is further configured to:
identify a position of the electronic device and control the adjustment circuit to adjust at least one of the phase or amplitude of each of the plurality of electrical signals individually input to the plurality of patch antennas based on, at least, the position of the electronic device.

11. The wireless power transmitter of claim 10,
wherein the adjustment circuit includes:
a first balun configured to generate a differential signal corresponding to each of the plurality of electrical signals individually input to the plurality of patch antennas;
an I/Q generation circuit configured to generate a positive I signal, a negative I signal, a positive Q signal, and a negative Q signal corresponding to the differential signal;
an I/Q amplification circuit configured to adjust an amplitude of at least one of the positive I signal, the negative I signal, the positive Q signal, or the negative Q signal;
a combiner configured to generate synthesized differential signals by synthesizing the positive I signal, the negative I signal, the positive Q signal, and the negative Q signal the amplitude of at least one of which has been adjusted; and
a second balun configured to output an output signal by synthesizing the synthesized differential signals.

12. An electronic device, comprising:
a plurality of patch antennas;
a sensor;
a communication circuit; and
a processor configured to:
control the electronic device to receive at least part of an RF wave of a first beam width formed from a wireless power transmitter via the plurality of patch antennas,
obtain sensing data about a posture of the electronic device associated with rotation of the electronic device via the sensor,
transmit the sensing data to the wireless power transmitter via the communication circuit, and
control the electronic device to receive at least part of the RF wave whose beam width has been adjusted from the first beam width to a second beam width based on, at least, the transmitted sensing data via the plurality of patch antennas.

13. The electronic device of claim 12, wherein the processor is further configured to:
identify an effective reception area in which the electronic device receives the RF wave, and
transmit information about the effective reception area to the wireless power transmitter via the communication circuit.

14. The electronic device of claim 13, wherein the processor is further configured to:
identify the effective reception area based on, at least, the posture associated with rotation of the electronic device.

15. The electronic device of claim 14, wherein the processor is further configured to:
identify a strength of an electrical signal output from each of the plurality of patch antennas, and
identify the effective reception area based on, at least, a number or an area of patch antennas outputting an electrical signal whose strength exceeds a threshold.

* * * * *